US012353454B2

(12) United States Patent
Jiao et al.

(10) Patent No.: US 12,353,454 B2
(45) Date of Patent: Jul. 8, 2025

(54) LOOK AHEAD STRATEGY FOR TRIE-BASED BEAM SEARCH IN GENERATIVE RETRIEVAL

(71) Applicant: Microsoft Technology Licensing, LLC, Redmond, WA (US)

(72) Inventors: Jian Jiao, Bellevue, WA (US); Yeyun Gong, Beijing (CN); Nan Duan, Beijing (CN); Ruofei Zhang, Sunnyvale, CA (US); Ming Zhou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/031,789

(22) PCT Filed: Oct. 14, 2020

(86) PCT No.: PCT/CN2020/120731
§ 371 (c)(1),
(2) Date: Apr. 13, 2023

(87) PCT Pub. No.: WO2022/077244
PCT Pub. Date: Apr. 21, 2022

(65) Prior Publication Data
US 2023/0385315 A1    Nov. 30, 2023

(51) Int. Cl.
*G06Q 30/00*        (2023.01)
*G06F 16/3332*      (2025.01)
(Continued)

(52) U.S. Cl.
CPC ..... *G06F 16/3338* (2019.01); *G06Q 30/0254* (2013.01); *G06Q 30/0256* (2013.01)

(58) Field of Classification Search
CPC ............ G06F 16/3338; G06F 16/9532; G06Q 30/0254; G06Q 30/0256
See application file for complete search history.

(56) References Cited

U.S. PATENT DOCUMENTS 7,725,321 B2 * 5/2010 Bennett ................. G06F 40/216
704/270.1
10,346,548 B1 * 7/2019 Wuebker ................. G06F 40/58
(Continued)

FOREIGN PATENT DOCUMENTS

CN         106537370 A     3/2017
CN         110457661 A    11/2019
(Continued)

OTHER PUBLICATIONS

"An end-to-end Generative Retrieval Method for Sponsored Search Engine—Decoding Efficiently into a Closed Target Domain", (Yijiang). (Year: 2019).*

(Continued)

*Primary Examiner* — Maria V Vanderhorst
(74) *Attorney, Agent, or Firm* — Shook, Hardy & Bacon L.L.P.

(57) ABSTRACT

Systems and methods are provided for generating a keyword sequence from an input query. A first text sequence corresponding to an input query may be received and encoded into a source sequence representation using an encoder of a machine learning model. A keyword sentence may then be generated from the source sequence representation using a decoder of the machine learning model. The decoder may generate a modified generation score for a plurality of prediction tokens, wherein the modified generation score is based on the respective prediction token generation score and a maximum generation score for a suffix of each prediction token. The decoder may then select the prediction token of the plurality of prediction tokens based on the modified generation score, and add the selected prediction token to the previously decoded partial hypothesis provided by the decoder.

20 Claims, 22 Drawing Sheets

(51) Int. Cl.
　　　*G06Q 30/0251*　　　(2023.01)
　　　*G05B 19/418*　　　(2006.01)

(56) References Cited

U.S. PATENT DOCUMENTS

| | | | |
|---|---|---|---|
| 11,520,971 B2* | 12/2022 | Chaturvedi | G06F 40/166 |
| 2008/0215557 A1 | 9/2008 | Ramer et al. | |
| 2009/0324082 A1 | 12/2009 | Liu et al. | |
| 2012/0072287 A1 | 3/2012 | Crane | |
| 2017/0278514 A1 | 9/2017 | Mathias et al. | |
| 2018/0336198 A1 | 11/2018 | Zhong et al. | |
| 2018/0349351 A1 | 12/2018 | Singhal et al. | |
| 2019/0272296 A1* | 9/2019 | Prakash | G06F 16/24534 |
| 2020/0142917 A1 | 5/2020 | Paulus | |

FOREIGN PATENT DOCUMENTS

| | | |
|---|---|---|
| CN | 110597956 A | 12/2019 |
| CN | 111666299 A | 9/2020 |

OTHER PUBLICATIONS

"Topic level summary generation using BERT induced Abstractive Summarization Model". IEEE.2020 (Year: 2020).*
"Abstractive Summarization with Keyword and Generated Word Attention". IEEE. 2019. (Year: 2019).*
Gao, et al., "Learning Lexicon Models from Search Logs for Query Expansion", In Proceedings of Joint Conference on Empirical Methods in Natural Language Processing and Computational Natural Language Learning, Jul. 12, 2012, pp. 666-676.
Gu, et al., "Incorporating Copying Mechanism in Sequence-to-Sequence Learning", In Repository of arXiv:1603.06393v1, Mar. 21, 2016, 12 Pages.
He, et al., "Learning to Rewrite Queries", In Proceedings of 25th ACM International on Conference on Information and Knowledge Management, Oct. 24, 2016, pp. 1443-1452.
Hillard, et al., "Improving Ad Relevance in Sponsored Search", In Proceedings of Third ACM International Conference on Web Search and Data Mining, Feb. 4, 2010, pp. 361-369.
Jones, et al., "Generating Query Substitutions", In Proceedings of the 15th International Conference on World Wide Web, May 23, 2006, pp. 387-396.
Kannan, et al., "Smart Reply: Automated Response Suggestion for Email", In Proceedings of 22nd ACM SIGKDD International Conference on Knowledge Discovery and Data Mining., Aug. 13, 2016, pp. 955-964.
Laddha, et al., "Understanding Chat Messages for Sticker Recommendation in Hike Messenger", In Repository of arXiv:1902.02704v1, Feb. 7, 2019, 9 Pages.
Lee, et al., "Rare Query Expansion through Generative Adversarial Networks in Search Advertising", In Proceedings of the 24th ACM SIGKDD International Conference on Knowledge Discovery & Data Mining., Aug. 19, 2018, pp. 500-508.
Lian, et al., "An end-to-end Generative Retrieval Method for Sponsored Search Engine—Decoding Efficiently into a Closed Target Domain", In Repository of arXiv:1902.00592v1, Feb. 2, 2019, 8 Pages.
Loper, et al., "NLTK: The Natural Language Toolkit", In Repository of arXiv:cs/0205028v1, May 17, 2002, 8 Pages.
"International Search Report and Written Opinion Issued in PCT Application No. PCT/CN20/120731", Mailed Date: Jul. 6, 2021, 9 Pages.
Qi, et al., "ProphetNet-Ads: A Looking Ahead Strategy for Generative Retrieval Models in Sponsored Search Engine", In Proceedings of 9th CCF International Conference on Natural Language Processing and Chinese Computing, Oct. 14, 2020, pp. 305-317.
Riezler, et al., "Query Rewriting using Monolingual Statistical Machine Translation", In Journal of Computational Linguistics, vol. 36, Issue 3, Sep. 1, 2010, pp. 569-582.
Robertson, et al., "Okapi At Trec-3", In Proceedings of The Third Text REtrieval Conference (TREC-3), Apr. 1995, pp. 109-126.
See, et al., "Get To The Point: Summarization with Pointer-Generator Networks", In Repository of arXiv:1704.04368v1, Apr. 14, 2017, 19 Pages.
Shan, et al., "Fast Language Model Look-ahead Algorithm Using Extended N-gram Model", In Journal of Acta Automatica Sinica, vol. 38, Issue 10, Oct. 31, 2012, pp. 1618-1626.
Wu, et al., "Google's Neural Machine Translation System: Bridging the Gap between Human and Machine Translation", In Repository of arXiv:1609.08144v1, Sep. 26, 2016, 23 Pages.
Yan, et al., "ProphetNet", Retrieved From: https://web.archive.org/web/20210106212808/https://github.com/microsoft/ProphetNet, Nov. 30, 2020, 12 Pages.
Yan, et al., "ProphetNet: Predicting Future N-gram for Sequence-to-Sequence Pre-training", In Repository of arXiv:2001.04063v1, Jan. 13, 2020, 10 Pages.
Ye, et al., "PhotoReply: Automatically Suggesting Conversational Responses to Photos", In Proceedings of World Wide Web Conference, Apr. 23, 2018, pp. 1893-1899.
Anonymous: "Suffix tree", accessed on link https://en.wikipedia.org/w/index.php?title=Suffix_tree&oldid=980067782, Sep. 24, 2020, 4 pages.
Anonymous: "Trie", accessed on link https://en.wikipedia.org/w/index.php?title=Trie&oldid=979971471, Sep. 23, 2020, 5 pages.
Search Report Received for European Application No. 20957025.8, mailed on May 15, 2024, 10 pages.
Communication pursuant to Rules 70(2) and 70a(2) EPC received for European Application No. 20957025.8, mailed on Jun. 5, 2024, 1 Page.
First Office Action Received for Chinese Application No. 202080106212.1, mailed on Dec. 17, 2024, 19 pages. (English Translation Provided).

* cited by examiner

LOOK AHEAD STRATEGY FOR TRIE-BASED BEAM SEARCH IN GENERATIVE RETRIEVAL

CROSS-REFERENCE TO RELATED APPLICATION

This application is the U.S. national phase of the International Patent Application PCT/CN2020/120731, filed Oct. 14, 2020, the entire content of which is incorporated herein by reference.

BACKGROUND

Search queries from users may be expanded or otherwise modified to include keywords relevant to a media content provider. As media content providers tend to rely on triggered keywords to display their content when a user clicks on the content, the expansion or modification of search queries from users to keywords in libraries that are relevant to the content provider is of high interest. Whereas past keywords needed to be identical to user entered queries to trigger the content to be displayed to the user, methods like information retrieval with quality filtering are commonly used to recall more relevant keywords. However, traditional information retrieval techniques are unable to fill the semantic Rap between queries and keywords. Thus, a key interest for search engine service providers is developing more semantically related keywords from user queries than generating keywords from traditional information retrieval techniques. It is with respect to these and other general considerations that embodiments have been described. Also, although relatively specific problems have been discussed, it should be understood that the embodiments should not be limited to solving the specific problems identified in the background.

SUMMARY

In accordance with examples of the present disclosure, a method for generating a keyword sequence from an input query is provided. The method may include receiving a first text sequence corresponding to an input query, and encoding the first text sequence into a source sequence representation using an encoder of a machine learning model, generating a keyword sequence from the source sequence representation using a decoder of the machine learning model. In addition, the method may include generating a generation score for a plurality of prediction tokens, wherein the plurality of prediction tokens are based on the source sequence representation and a previously decoded partial hypothesis provided by the decoder, generating a modified generation score for the plurality of prediction tokens, wherein the modified generation score is based on the respective prediction token generation score and a maximum generation score for a suffix of each prediction token, selecting the prediction token of the plurality of prediction tokens based on the modified generation score, and adding the selected prediction token to the previously decoded partial hypothesis provided by the decoder. Content may then be selected and provided to a computing device in response to the input query based on the selected prediction token, where the selected prediction token matches at least one keyword associated with the content to be provided to the computing device. By modifying the scores of the next prediction tokens by looking ahead to future tokens' scores, the searching space can be optimized allowing the recall of more relevant keywords than past sequence prediction models. Moreover, future information associated with future tokens can be utilized to alleviate commonly encountered issues, such as but not limited to a common prefix that is not part of a desired target sequence or encountering "noise" or misspelled words in the target sequence.

In some examples, a computer-readable storage medium is provided. The computer-readable storage medium may include instructions, which when executed by a processor, cause the processor to receive a first text sequence corresponding to an input query, encode the first text sequence into a source sequence representation using an encoder of a machine learning model, generate a keyword sequence from the source sequence representation using a decoder of the machine learning model, generate a generation score for a plurality of prediction tokens, wherein the plurality of prediction tokens are based on the source sequence representation and a previously decoded partial hypothesis provided by the decoder, generate a modified generation score for the plurality of prediction tokens, wherein the modified generation score is based on the respective prediction token generation score and a maximum generation score for a suffix of each prediction token of the plurality of prediction tokens, select a prediction token of the plurality of prediction tokens based on the modified generation score, and add the selected prediction token to the previously decoded partial hypothesis provided by the decoder. In some examples, a system including a processor and memory is provided. The processor may include instructions to perform a method, the method including receiving a first text sequence corresponding to an input query, and encoding the first text sequence into a source sequence representation using an encoder of a machine learning model, generating a keyword sequence from the source sequence representation using a decoder of the machine learning model. In addition, the processor may a generate score for a plurality of prediction tokens, wherein the plurality of prediction tokens are based on the source sequence representation and a previously decoded partial hypothesis provided by the decoder, generate a modified generation score for the plurality of prediction tokens, wherein the modified generation score is based on the respective prediction token generation score and a maximum generation score for a suffix of each prediction token, select the prediction token of the plurality of prediction tokens based on the modified generation score, and add the selected prediction token to the previously decoded partial hypothesis provided by the decoder. Content may then be selected and provided to a computing device in response to the input query based on the selected prediction token, where the selected prediction token matches at least one keyword associated with the content to be provided to the computing device. By modifying the scores of the next prediction tokens by looking ahead to future tokens' scores, the searching space can be optimized allowing the recall of more relevant keywords than past sequence prediction models. Moreover, future information associated with future tokens can be utilized to alleviate commonly encountered issues, such as but not limited to a common prefix that is not part of a desired target sequence or encountering "noise" or misspelled words in the target sequence.

In some aspects of the above method, system, and/or computer-readable storage medium, the generation score for the suffix of each prediction token of the plurality of prediction tokens may be based on a generation score for a token that is a suffix of the suffix of one or more prediction tokens. Accordingly, future information for tokens beyond immediate suffixes of prediction tokens can be used to optimize the searching space and allow the recall of more relevant keywords than past sequence prediction models.

In some aspects of the above method, system, and/or computer-readable storage medium, the plurality of prediction tokens and the suffix of each prediction token are accessed from a Trie and/or are constrained to the Trie. As the number of possible prediction tokens to choose from may be substantially reduced when using a Trie, the methods described herein may not encounter the overhead associated with searching a search space that is larger than the Trie. For example, an amount of resource utilized, such as memory and compute, may be decreased. In some aspects, the Trie may be specific to an input query such that keyword specific Tries may be generated.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 12 is a block diagram illustrating physical components (e.g., hardware) of a computing device with which aspects of the disclosure may be practiced.

DETAILED DESCRIPTION

Figure 1:
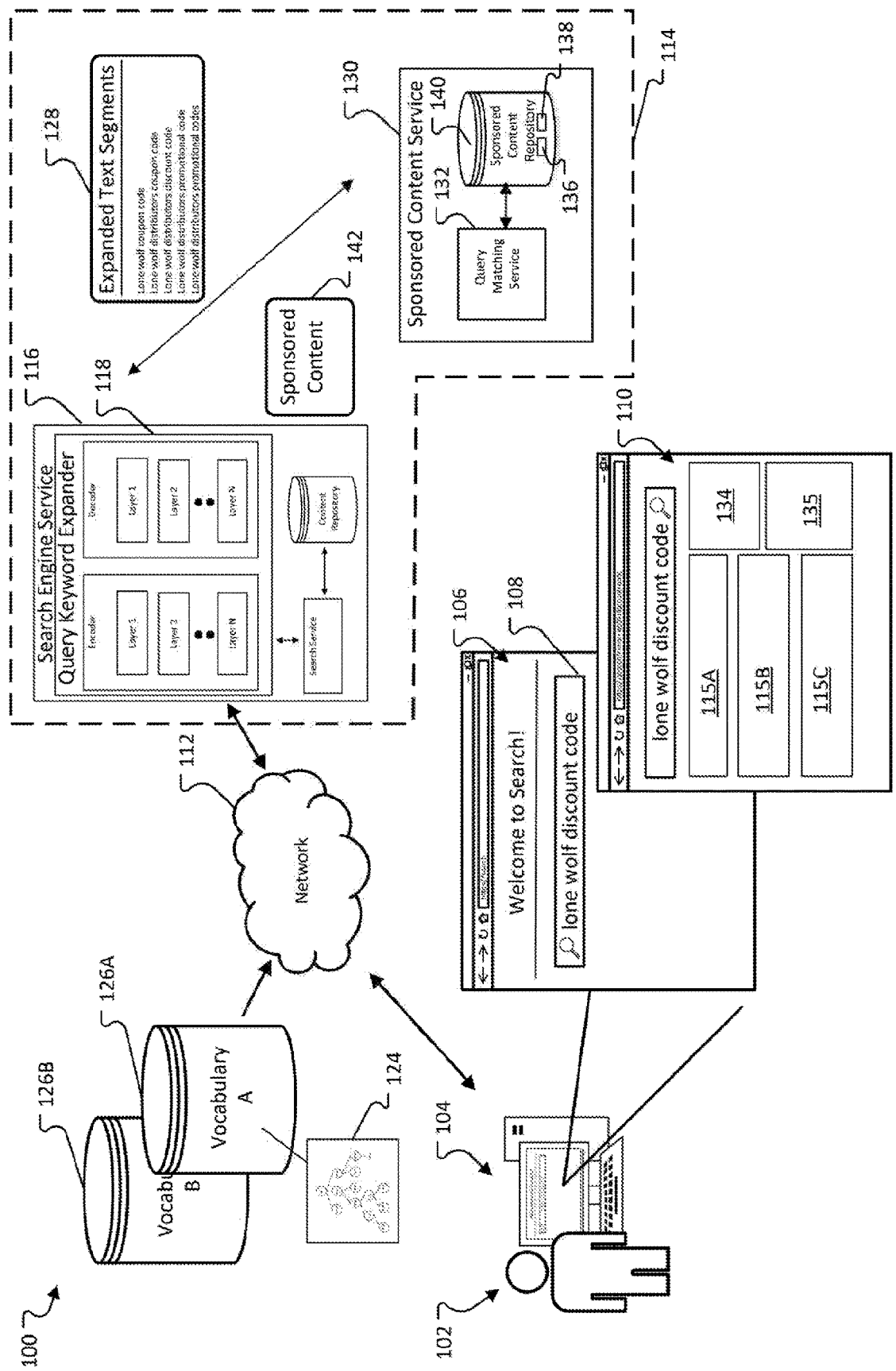
FIG. 1 depicts an example system for performing a look-ahead strategy for Trie-based generative retrieval models in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In a sponsored search engine, search queries from users are expanded or otherwise modified to include keywords relevant to a sponsor, such as an advertiser. The sponsors may bid on triggered keywords to display their content and may pay the sponsored search engine on a per click basis when a user clicks on the content. As the primary income for a sponsored search engine is to provide content that is potentially of interest to users, the expansion or modification of search queries from users to keywords in keyword libraries that are relevant to the sponsor is of high interest to sponsored search engine providers. Whereas past keywords needed to be identical to user entered queries to trigger content to be displayed to the user, methods like information retrieval with quality filtering are commonly used to recall more relevant keywords. However, traditional information retrieval techniques are unable to fill the semantic gap between queries and keywords provided by sponsors. Thus, sponsored search engine service providers are interested in developing more semantically related keywords from user queries than generating keywords from traditional information retrieval techniques.

In some examples, an initial user query is rewritten to include a range of intermediate queries; the results of the intermediate queries may then be combined. Query rewriting strategies are often widely used but tend to be inefficient because many of the keywords generated from extended query rewriting strategies are not included in keyword libraries associated sponsors or other media content providers. An example of query rewriting may include utilizing natural language generation (NLG) sequence-to-sequence (Seq2Seq) models to output one or more text segments based on an input text segment, such as a user query. The NLG Seq2Seq models may receive the input, such as a query, and generate a plurality of output segments one word at a time during a decoding process. That is, each output segment may include a plurality of tokens, or words, generated at various time steps throughout the decoding process. At each decoding time step, a plurality of predicted tokens, or predicted words, are generated, where each predicted token, or predicted word, is associated with a generation score. The generation score indicates a conditional probability, or likelihood, that the predicted token, or predicted word, is the next element in the output segment based on the input and the previously predicted output segment—also referred to as a decoded partial hypothesis. The decoded partial hypothesis is a partial output segment including previously predicted tokens, or words, generated at previous time steps. Accordingly, once the decoding process has completed, one or more most decoded partial hypotheses may have been predicted by the decoder. However, in some examples, an NLG Seq2Seq model may be efficient at generating fluent sentences but may lack the accuracy to generate queries that include keywords found in a library or are otherwise of interest to a sponsor, advertiser, or other media content provider.

In some examples, a Trie-based Seq2Seq model generates a word, or token, at each time step, where the word, or token, exists on a path of a Trie. A Trie, also known as a prefix tree, is a tree-like data structure having nodes that store each keyword in a library. By structuring the nodes in a particular way, text segments including one or more words, may be retrieved from the Trie by traversing down a branch path of the tree. Accordingly, in a Trie-based Seq2Seq model, all generated words, or tokens, are constrained to the Trie; thus, where the Trie is composed of keywords from a content keyword library associated with one or more sponsors, the output segments produced by a Trie-based Seq2Seq model may be restricted to the keyword library. While Trie-based Seq2Seq models constrain the generation of keywords to a searching space, namely those keywords appearing in the Trie, prior Trie-based Seq2Seq models do not utilized global information and therefor suffer from noise, common prefix, and token selection issues.

That is, when constraining a Seq2Seq model to a Trie, the model may generate tokens, or words, that exist in a Trie, but have a low generation score. Relying on such tokens with a low generation score may lead to an incorrect search path in the Trie and may lead to a low efficient outcome, where the Seq2Seq model generates text segments that are not semantically similar to the user query or keywords in a content keyword library associated with one or more sponsors. Such generated tokens having a low generation score may be referred to as noise tokens.

A second issue with prior Trie-based Seq2Seq models occurs when encountering common prefixes in a Trie that have no future objects. For example, in a Trie-based Seq2Seq model, common prefixes may contribute to relevant keywords; however, expected suffixes of the common prefixes may not exist in the Trie and therefore a desired keyword segment may not be generated. Simply removing the common prefixes from the Trie will not resolve this issue as these prefixes are common in desired keyword segments and are therefore needed to generate such desired keyword segments. In addition, Trie-based Seq2Seq models also suffer from token selection issues when several predicted suffixes have similarly high generation scores. While each of the suffixes having high generation scores may be used to compose a fluent sentence, using such suffixes for keyword extensions may not lead to a desired keyword segment because prior Trie-based Seq2Seq models do not have sufficient information as to which suffix will lead to the desired path in the Trie and therefore a desired keyword segment.

In accordance with examples of the present disclosure, by using a Trie-based NLG model to predict the next several tokens simultaneously, the future generation scores related to future tokens in a Trie can be used to look ahead in the Trie and optimize a searching space. That is, with a Trie-based search, the next token to be generated by the model is constrained to the possible suffixes that exists in the Trie, where the possible suffixes are suffixes of one or more tokens in the decoded partial hypothesis.

More specifically, whereas NLG Seq2Seq models may predict a next token or word based on the generation score or token of the word, examples of the present disclosure modify such generation scores as a weighted sum of the generation score and future token generation scores to optimize the searching space. Each predicted token or word may then be ranked according to the modified score and may be selected as the next element in the segment or output. However, the original generation score of the selected token or word may be used when basing future predictions of a decoded partial hypothesis.

FIG. 1 depicts an example system 100 for performing a look-ahead strategy for Trie-based generative retrieval models in accordance with examples of the present disclosure. The system 100 may allow a user 102 to interact with a computing device 104 that renders content 106 at a display of the computing device 104. The content 106 that is rendered may be received from a computing device, or server 114, via the network 112 and may be displayed as part of a web page, application, or app for example. The rendered content 106 may allow a user, such as the user 102, to enter a query 108 comprising one or more words, phrases, text segments, or symbols for example, and provide the query 108 to a search engine service 116 via the network 112, where the search engine service 116 may be running at or otherwise hosted by the computing device, or server 114. The computing device, or server 114, may include one or more computing devices that provide distributed or cloud-based services, such as the search engine service 116. The search engine service 116 may provide content to the computing device 104 based on the query 108. For example, the search engine service 116 may receive the query 108 and identify content that matches or otherwise is similar to the query 108. In some examples, a search index of indexed content may be utilized to determine the content results that match or is otherwise similar to the query 108. The search engine service 116 may then assemble results and provide the assembled results to the computing device 104 as content 110 for example. The content 110 may be rendered at a display of the computing device 104 and may include the results 115A, 115B, 115C for example that match or otherwise are similar to the query 108. The content 110 may also include sponsored content 134 and 135 that include sponsored content, also referred to as advertisements, and are rendered at the display of the computing device 104 in response to the query 108.

To determine the sponsored content 134 and/or 135 that is to be provided in response to the query 108, the search engine service 116 may include a query keyword expander 118; the query keyword expander 118 may receive the query 108 and expand the query 108 into a plurality of expanded text segments 128. In some examples, sponsored content 134 and/or 135 may be an advertisement. The query keyword expander 118 may utilize a Seq2Seq model that employs an encoder to encode the query as a source sequence representation, and a decoder which provides one or more text segments as a conditional likelihood based on the source sequence representation and previous predicted segments, also referred to as a decoded partial hypotheses. The plurality of expanded text segments 128 may be provided to a sponsored content service 130 which receives the plurality of expanded text segments 128 and uses a query matching service 132 to identify sponsored content associated with the plurality of expanded text segments 128. For example, the query matching service 132 may identify sponsored content 134 based on the plurality of expanded text segments 128 and a plurality of keywords 136 associated with sponsored content 138 in a sponsored content repository 140. The plurality of keywords 136 may correspond to a plurality of keyword bids that have been placed by or otherwise associated with sponsors; accordingly, sponsored content associated with sponsor having a highest bid for a keyword or keywords matching one or more text segments in the plurality of expanded text segments 128 may be provided in response to the query 108. Thus, the sponsored content service 130 may provide sponsored content 142, or a location associated with the sponsored content to the search engine service 116 such that the search engine service 116 may provide the sponsored content 142 as part of a response to the user entered query 108. Accordingly, the sponsored content may be provided as part of the content 110 and may be rendered to a display of the computing device 104.

In some examples, the query keyword expander 118 may provide, or generate, the plurality of expanded text segments 128 based on a vocabulary 126A, 126B, where the vocabulary 126A, 126B may include a plurality of text segments. The plurality of text segments may correspond to the keyword segments arranged as in a Trie 124. As previously mentioned, a Trie is a tree-like data structure having nodes that store each of the keywords. By structuring the nodes in a particular way, text segments including one or more words may be retrieved from the Trie by traversing down a branch path of the tree. The vocabulary 125A, 126A containing the Trie 124 may be accessible via the network 112; alternatively, or in addition, the vocabulary 126A containing the Trie 124 may reside in or otherwise be a part of the query keyword expander 118.

Figure 2A:
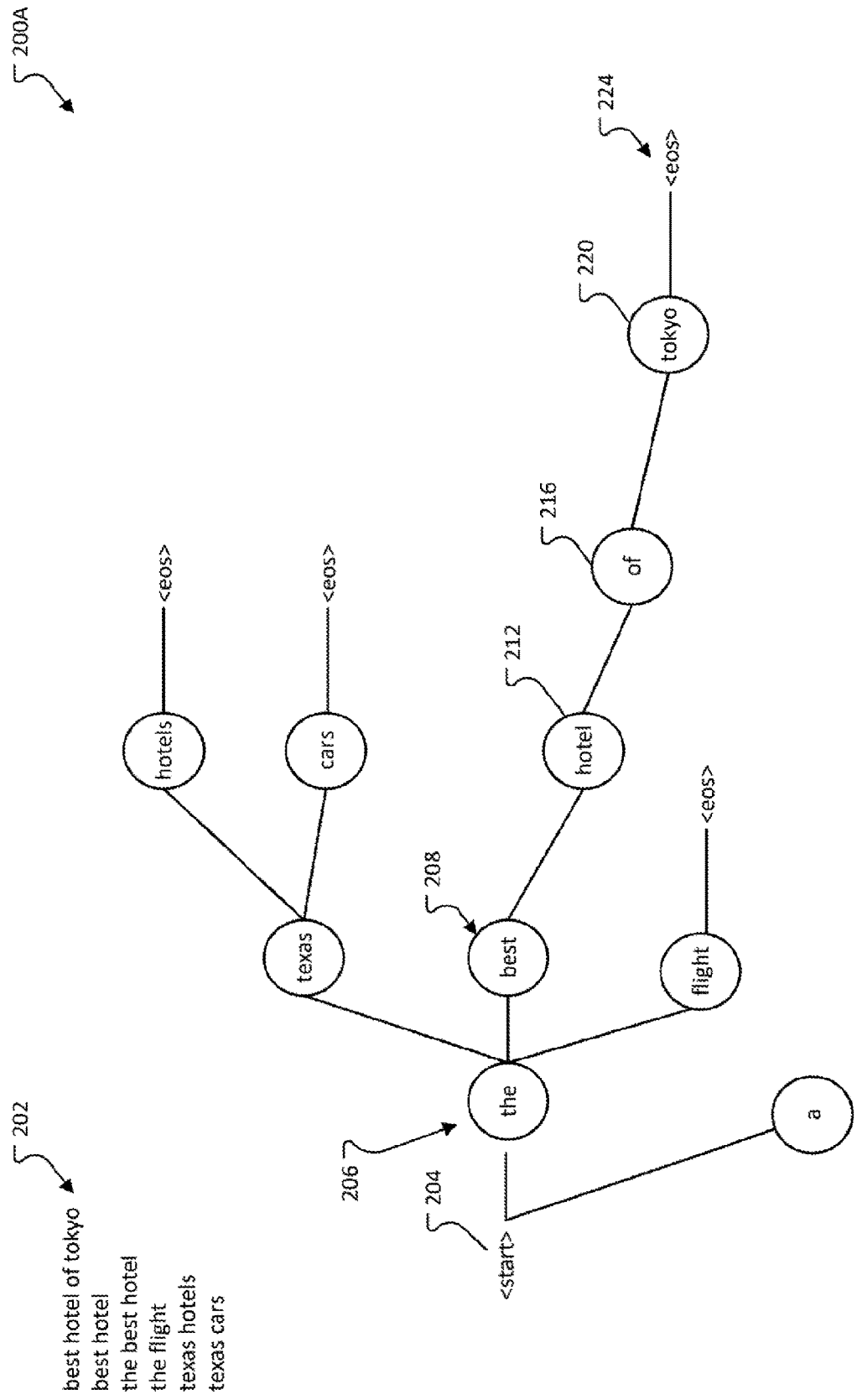
FIG. 2A depicts details of a first Trie.

FIGS. 2A-2E provide additional examples of a Trie in accordance with examples of the present disclosure. More specifically, FIG. 2A depicts details of a first Trie 200A. As a non-limiting example, the first Trie 200A may include keywords, or text segments 202, which may be associated with keyword bids placed by one or more sponsors. For example, the text segments may include a phrase "best hotel of tokyo" which when generated as part of a query, such as query 108, would return a sponsor's content, such as an ad, associated with such phrase. As another example, the text segments may include a phrase "texas hotels." When a query, such as query 108, generates "texas hotels," content specific to a sponsor may be displayed, where the sponsor may have a bid, or otherwise has provided some means of compensation to have the content displayed when the query, or expanded text segments associated with the query, match the desired text segment.

Each of the text segments 202 is represented as a plurality of tokens, or nodes. That is, each word in the text segments 202 may be arranged as an ordered token in the first Trie 200A. As an example, the first Trie 200A may include a start token 204 which generally identifies a beginning node of the Trie. A next token 206 associated with the word "the" may follow the start token 204. As "the" is a commonly used word, additional tokens may be arranged a suffix of "the." For example, "texas", "best" 208, and "flight" are suffixes of the token "the." As further depicted in the first Trie 200A, each of the words in each of the text segments 202 may reside in an ordered manner. That is, the phrase "best hotel of tokyo" may comprise tokens 208, 212, 216, and 220. In some examples, the ending node, or leaf node, may comprise an end of sentence (e.g., <eos>) token 224 denoting the end of a particular text segment or sentence. Accordingly, a phrase or sentence may comprise all tokens between a start token 204 and a leaf node, or <eos> token 224.

Figure 2B:
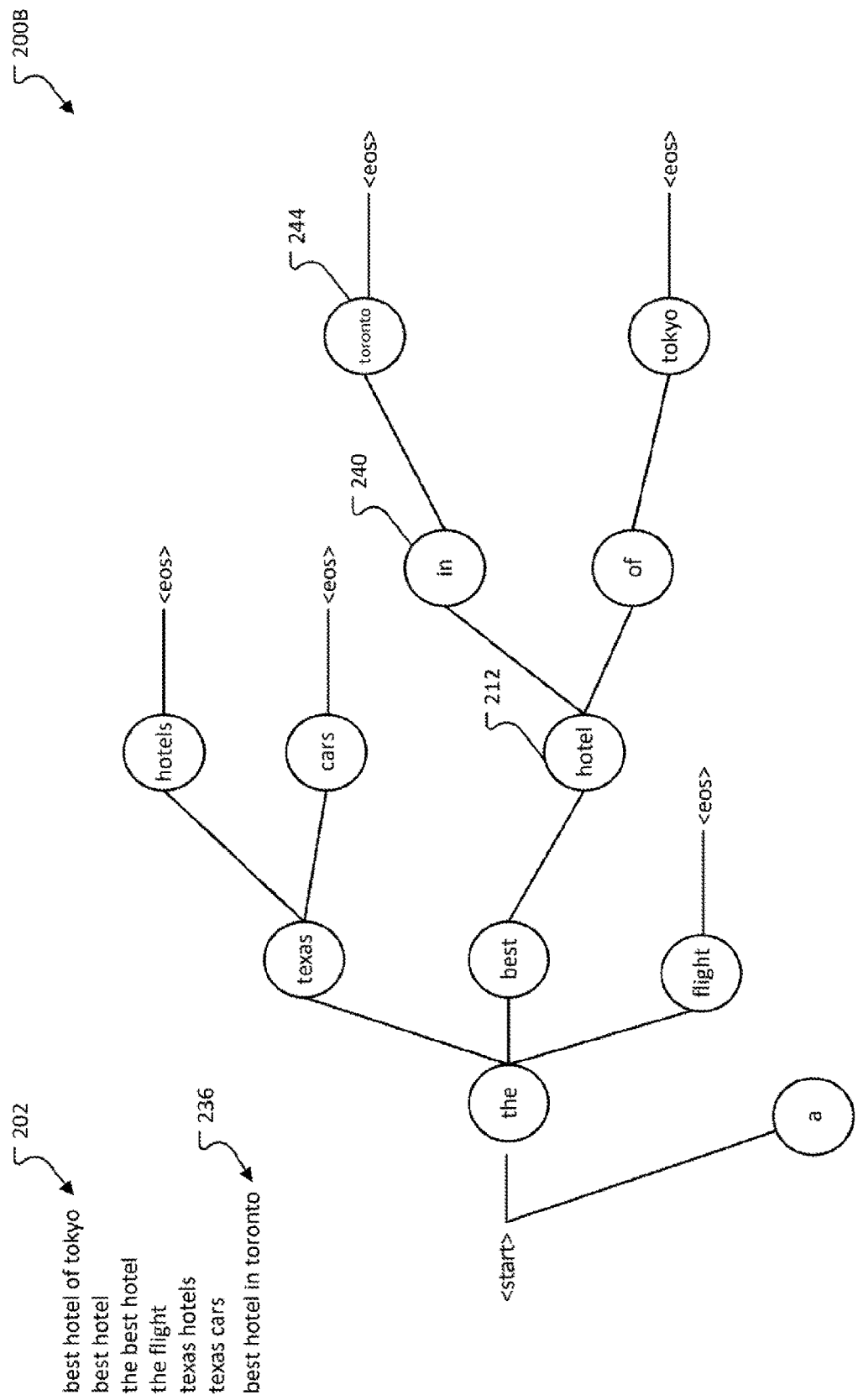
FIG. 2B depicts details of a second Trie.
Figure 2C:
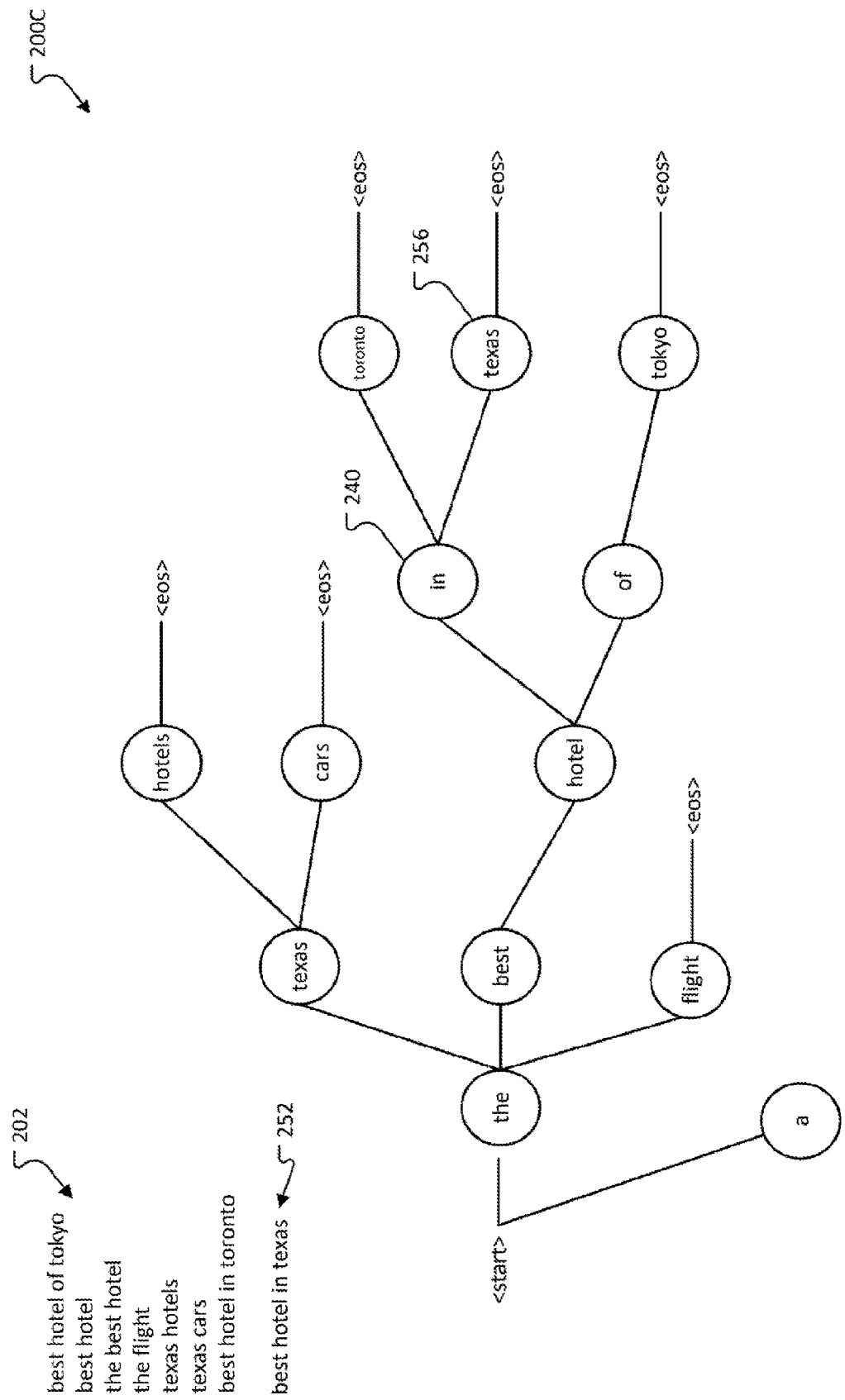
FIG. 2C depicts details of a third Trie.
Figure 2D:
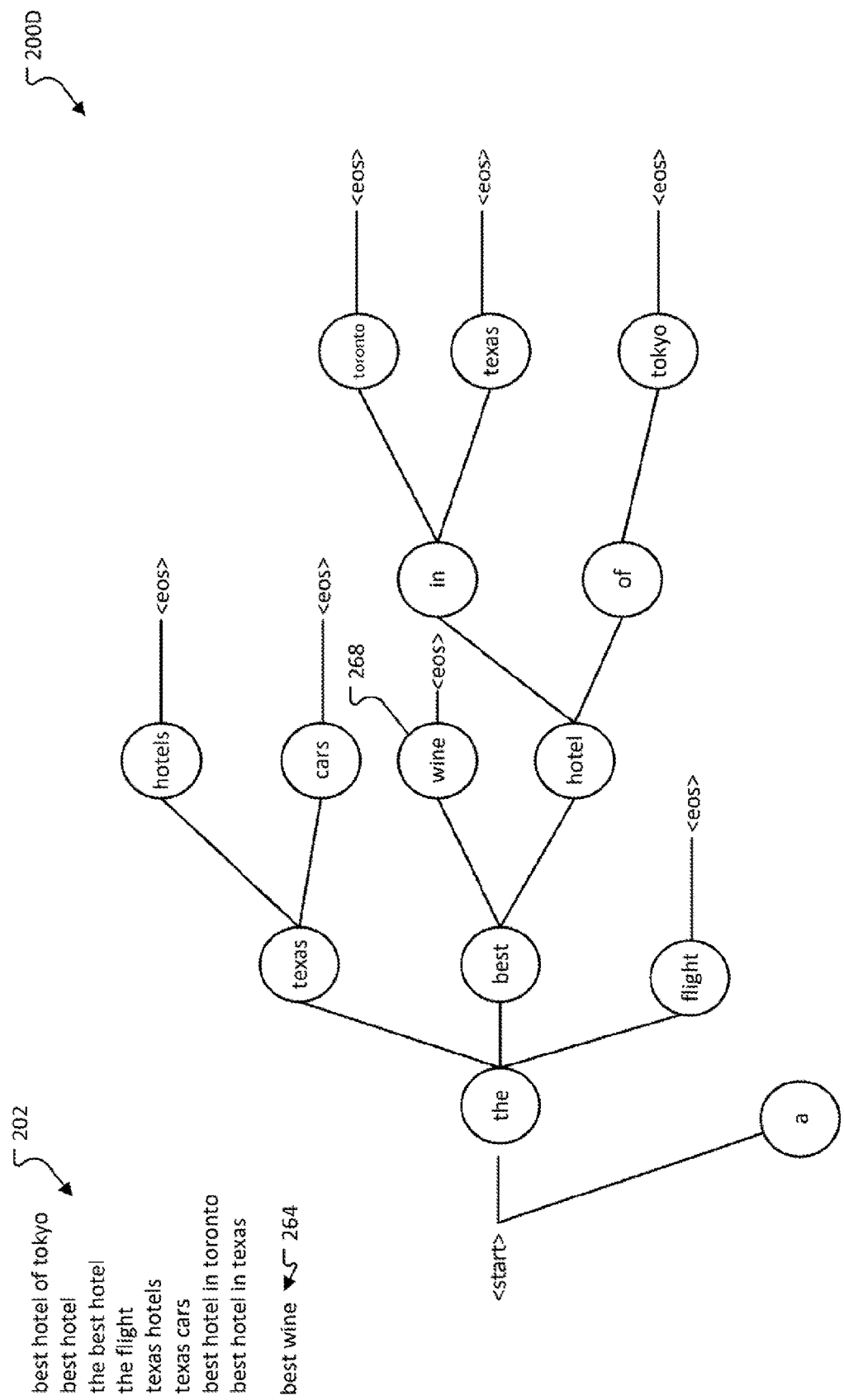
FIG. 2D depicts details of a fourth Trie.

As depicted in FIG. 2B, a keyword 236 for example may be added to the existing first Trie 200A to generate a second Trie 200B. Because the tokens "best" and "hotel" have already been included in the first Trie 200A, the "in" token 240 and "toronto" token 244 can be added to the "hotel" token 212. As another example, a keyword 252 may be added to the existing second Trie 200B to generate a third Trie 200C as depicted in FIG. 2C. Because the "best" token, "hotel" token, and "in" token have already been included in the second Trie 200B, the token "texas" 256 can be added to the "in" token 240. As another example, a text segment 264 maybe added to the existing third Trie 200C to generate a fourth Trie 200D as depicted in FIG. 2D. Because the "best" token has already been included in the third Trie 200C, the "wine" token 268 can be added to the "best" token. Of course, <eos> tokens may be added to denote the end of a text segment if needed. In examples, a text segment may correspond to a keyword and/or a sequence or segment of keywords.

Figure 2E:
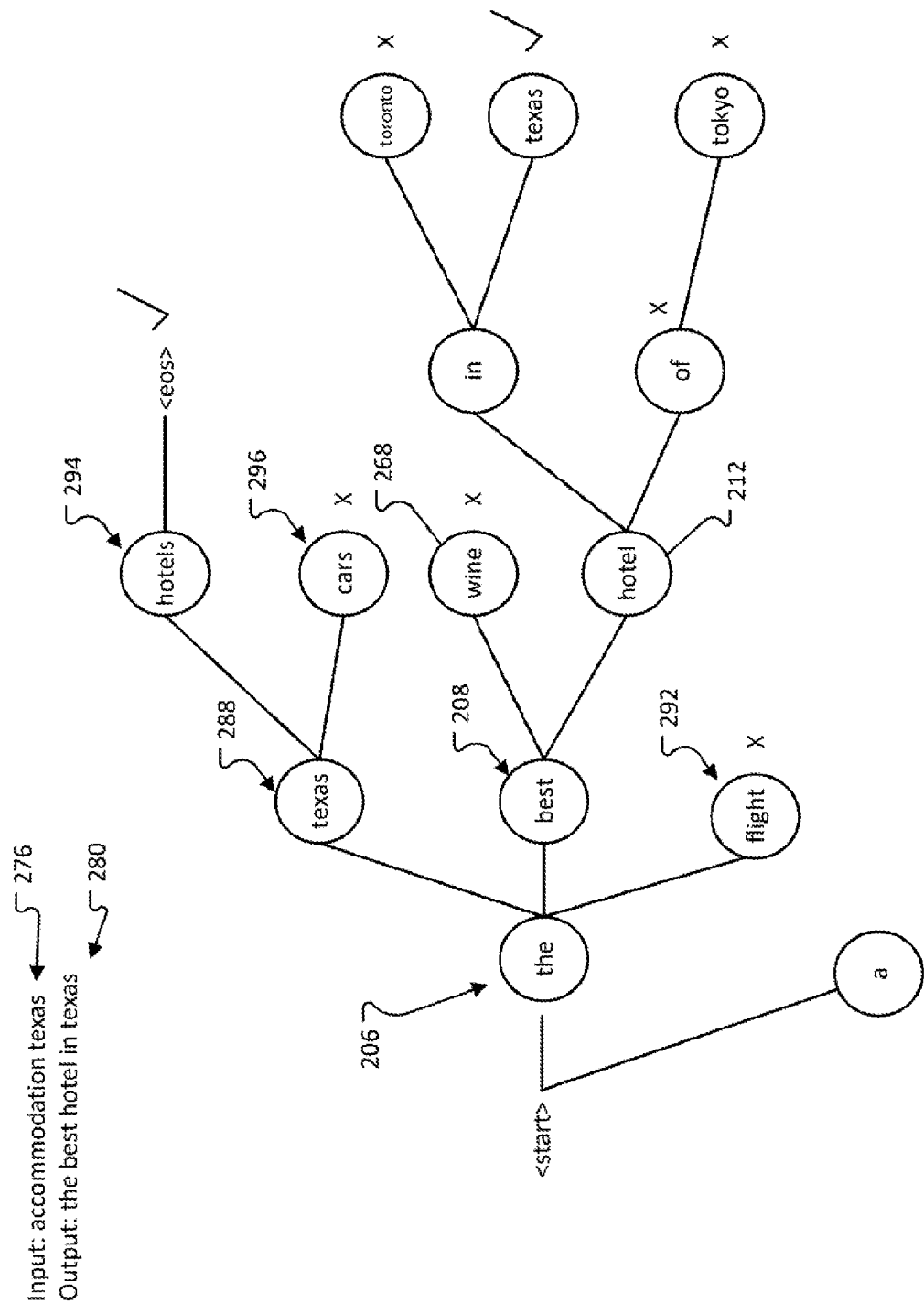
FIG. 2E depicts details of a fifth Trie.

In accordance with some examples of the present disclosure, the Trie, such as the Trie depicted in FIG. 2E, may be used to constrain output predictions made by a Seq2Seq model, at one or more time steps, to the tokens appearing within the Trie. Accordingly, text segments most similar to an input query, such as the query 108 may be generated by the Seq2Seq model based on the vocabulary of the Trie.

Figure 3:
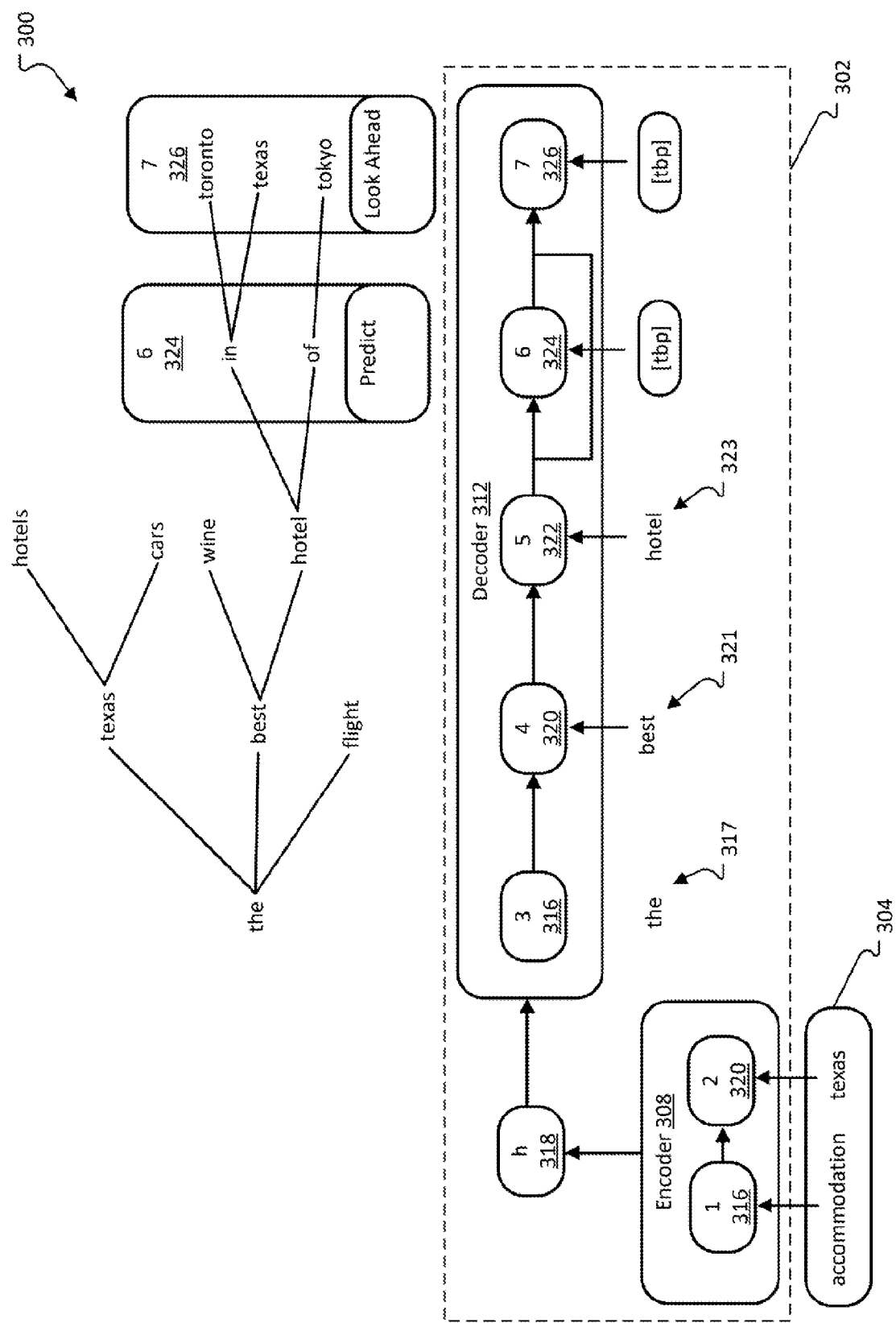
FIG. 3 depicts details of a decoding process associated with a Seq2Seq model in accordance with examples of the present disclosure.

FIG. 3 depicts additional details of a decoding process 300 associated with a Seq2Seq model 302 in accordance with examples of the present disclosure. A Seq2Seq model is a type of an encoder-decoder based natural language generation model that maps an input of a sequence to an output sequence. A Seq2Seq model turns a received sequence into an output sequence. The Seq2Seq model may use one or more of a recurrent neural network (RNN), Long Short-Term Memory (LSTM) neural network, a Gated Recurrent Unit (GRU) neural network, or other machine learning constructs. The primary components of a Seq2Seq model include an encoder 308 and a decoder 312. The encoder 308 turns each item input into the encoder into a source sequence representation 318 containing the item and its context, where the context for each item may be the output of a previous step and may correspond to a decoded partial hypothesis. The decoder 312 generally reverses the process, turning the source sequence representation 318 into an output item, using the previous output, or decoded partial hypothesis, as the input context at each step. The Seq2Seq model 302 may be jointly trained to maximize the conditional probabilities of a target sequence given an input sequence.

The input sequence 304, which may correspond to a query 108, may be received by the encoder 308 of the Seq2Seq model 302; the input sequence 304 may be input one word at each time step 316, 320 to generate the source sequence representation 318. In examples, the encoder 308 may include a multi-layer Transformer encoder with a multi-head self attention mechanism, such as the encoder discussed by Yan et al. in the publication, "ProphetNet: Predicting Future N-gram for Sequence-to-Sequence Pre-training," which is incorporated herein by reference in its entirety, for all that it teaches and for all purposes. The encoder 308 may encode the input sequence 304 into a source sequence representation 318. The encoded source sequence representation 318 may then be provided to the decoder 312. The decoder 312 may include a LSTM+Trie model, as suggested by Chen et al. in the publication, "An end-to-end generative retrieval method for sponsored search engine decoding efficiently into a closed target domain," which is incorporated herein by reference in its entirety, for all that it teaches and for all purposes. In some examples, the decoder 312 model may implement a copy mechanism to emphasize generation scores of those words that appear in the input sequence 304. That is, output words often have some overlap with the input queries, and copy mechanism allows the model to directly select tokens from the input sequence 304 when composing an answer.

In accordance with examples of the present disclosure, utilizing the input sequence 304 and the encoder 308 generated source sequence representation 318, the decoder 312 may generate the output sequence by predicting one token, or word, at a time, for each next predicted word and for one or more look-head, or future predictions; each prediction may include a probability distribution over all possible words for each token in the output sequence for each respective position (e.g., next prediction, future prediction). In other words, for each word that the decoder 312 is predicting, it will generate a probability array indicating how likely a particular word is to be the next output token and/or how likely a particular word is to be a future output token. Each of these probabilities may be considered as a generation score.

As previously mentioned, the predicted next tokens and the predicted future tokens may be constrained to the words in a Trie, and more specifically, along a path in a Trie. Accordingly, the decoder 312 may determine generation scores for tokens in the Trie corresponding to the next token in the Trie and for one or more future tokens in the Trie. As an example, supposing that "the" 317 is selected at a time step 316, "best" 321 is selected at a third time step 322, and "hotel" 323 is selected at the third time step 322, the generation scores for the prediction tokens "in" and "of" may be generated at the time step 324, where the prediction tokens "in" and "of" correspond to the suffixes of the last predicted word (e.g., "hotel" 323) in the decoded partial hypothesis (e.g., "the best hotel") that occurs along a Trie path. In accordance with examples of the present disclosure, the decoder 312 may also generate generation scores for future tokens "toronto", "texas", and "tokyo" as look ahead predictions, where the look ahead predictions may impact the selection of the prediction token "in" or "of" as the next word in the output sequence.

In accordance with examples of the present disclosure, a modified generation score for the prediction token "in" may be based on the likelihood of "in" being the next word in the output sequence given the prior predicted segment "the best hotel" and the maximum likelihood of the next future tokens provided by the Trie (e.g., maximum of the likelihood that "toronto" is the next word in the output sequence given the prior predicted segment "the best hotel" or the likelihood that "texas" is the next word in the output sequence given the prior predicted segment "the best hotel"). "Toronto" and "texas" are the next suffix nodes (e.g., at time step 7 326) corresponding to the "the best hotel" route through the Trie when the prediction token "in" is selected. A generation score for the token "of" may be based on the prior predicted segment "the best hotel" and the maximum likelihood of the next future token(s) provided by the Trie (e.g., maximum of the likelihood that "tokyo" is the next word in the output sequence given the prior predicted segment "the best hotel"). "Tokyo" is the next suffix node (e.g., at time step 7 326) corresponding to the "the best hotel" route through the Trie when the prediction token "of" is selected. While FIG. 3 depicts a single look ahead at time step 326, additional look ahead time steps are contemplated.

FIGS. 4A-4E provide additional details directed to a decoding process associated with a Seq2Seq model in accordance with examples of the present disclosure. The encoder 402 may be the same as or similar to the encoder 308 previously discussed. The encoder 402 may receive an input sequence 401 and encode the input sequence into a source sequence representation h 404. The decoder 406 may be the same as or similar to the decoder 312 as previously discussed in accordance with examples of the present disclosure, the generation scores of the next prediction tokens may be modified by looking ahead to one or more future token's score based on a prior predicted segment. As previously discussed, issues associated with predictions where an input includes a common prefix but does not return a desired output, or where an input may include noise or includes a misspelling in the target sequence may be reduced.

The decoding example provided in FIGS. 4A-4E modifies a prediction token's generation score with information related to a suffix of the prediction token, where the prediction token and the future token are constrained to tokens in a Trie. The decoder 406 may look ahead $\ell$ steps, where $\ell$ may be equal to n−1 for an n-gram generation model. Accordingly, when determining predictions for a next output in the output sequence, generation scores for the next prediction tokens and for n−1 future tokens may be generated simultaneously; thus, the next first prediction token and n−1 future tokens may be used as a look ahead for this prediction. A residual weight $\lambda$ may be set to control the weight of next token's generation score and its look ahead score.

Figure 4A:
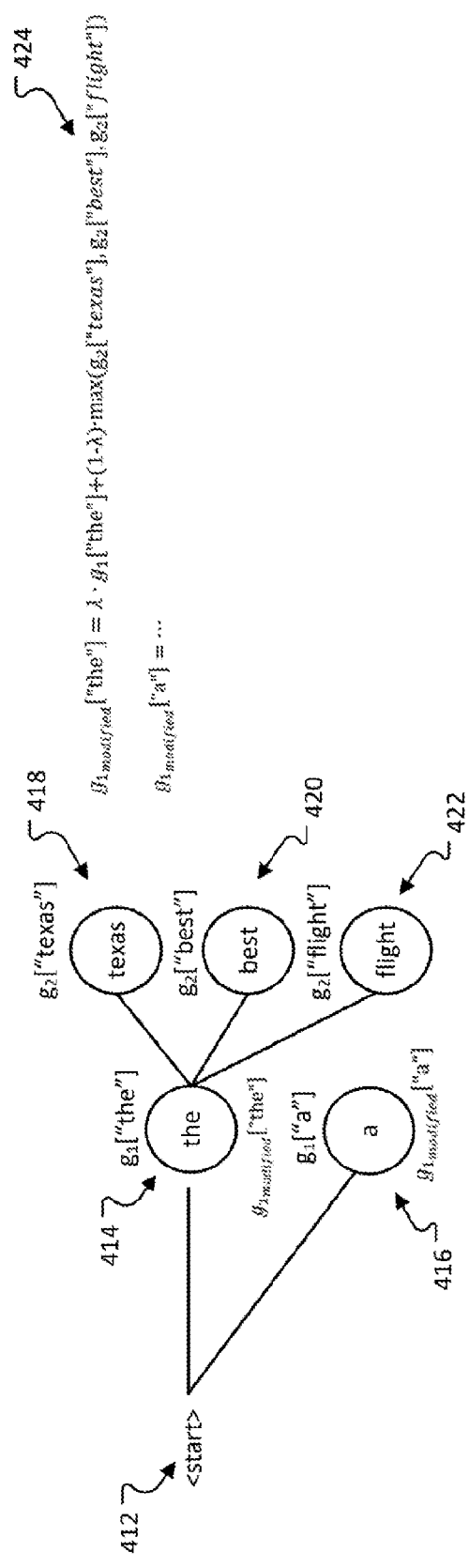
FIG. 4A depicts details of a decoding process associated with a Seq2Seq model in accordance with examples of the present disclosure.
Figure 4A:
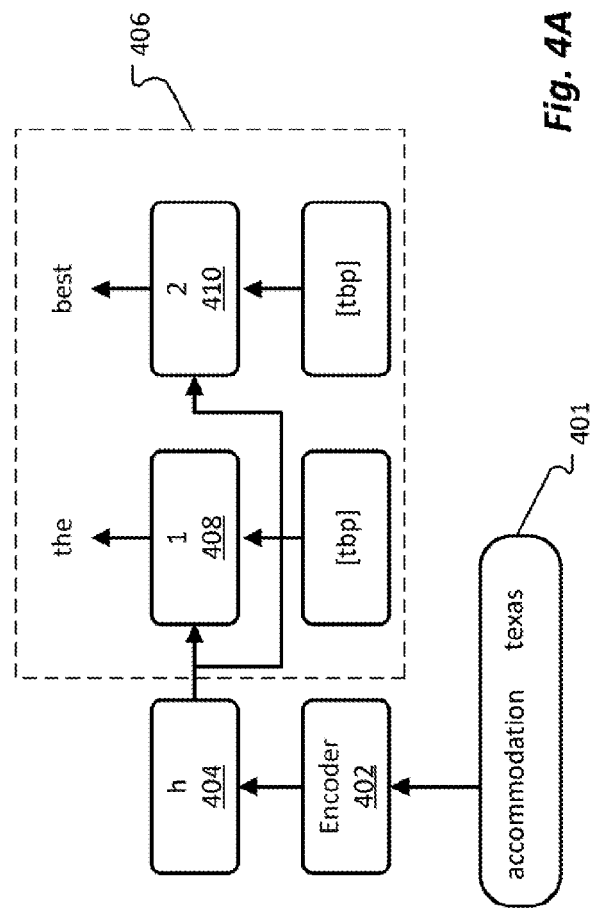

As depicted in FIG. 4A, the decoder 406 may simultaneously generate generation scores for a token to-be-predicted [tbd] 408 and a future token to-be-predicted [tbd] 410. The generation score for the token to-be-predicted [tbd] 408 may be referred to as $g_1$, and the generation score for the future token to-be-predicted [tbd] 410 may be referred to as $g_2$. The previously decoded sequence may be referred to as seq, which as depicted in FIG. 4A may include a <start> or begin-of-sentence <bos> token 412. The first suffixes of seq may be referred to as $s_1$ and for each node $\rho_1$ in $s_1$, one look-ahead step suffixes of $\rho_1$ are noted as $s_2$. The generation score of next first token $\rho_1$ is modified resulting in a modified generation score according to equation 1.

$$g_1[\rho_1] = \lambda \times g_1[\rho_1] + (1-\lambda) \times \max(g_2[s_2]) \qquad \text{Equation 1}$$

Accordingly, as depicted in FIG. 4A, the decoder 406 may generate a generation score $g_1$["the"] for the next prediction token 414 and a generation score $g_1$["a"] for the next prediction token 416, where prediction tokens 414 and 416 are constrained to a Trie, such as the Trie of FIG. 2E. That is, the generation score $g_1$["the"] may be equal to the probability that the token 414 "the" is the next token in the output sequence given the input sequence 401 and partially decoded output sequence, which as depicted in FIG. 4A may be equal to a <start> or begin-of-sentence <bos>token or identification. The generation score $g_1$["a"] may be equal to the probability that the token 416 "a" is the next token in the output sequence given the input sequence 401 and partially decoded output sequence, which as depicted in FIG. 4A may be equal to a <start> or begin-of-sentence <bos>token or identification. Additionally, the decoder 406 may generate a generation score $g_2$["texas"] for the future token 418, a generation score $g_2$["best"] for the future token 420, and a generation score $g_2$["flight"] for the future token 422, where tokens 418, 420, and 422 are suffixes of the prediction token 414 as indicated by the Trie. The generation score $g_2$["texas"] may be equal to the probability that the token 418 "texas" is the next token in the output sequence given the input sequence 401 and partially decoded output sequence, which as depicted in FIG. 4A may be equal to a <start> or begin-of-sentence <bos> token or identification. Similarly, the generation scores $g_2$["best"] and $g_2$["flight"] may be equal to the probability that the respective token 420 "best" or 422 "flight" is the next token in the output sequence given the input sequence 401 and partially decoded output sequence, which as depicted in FIG. 4A may be equal to a <start> or begin-of-sentence <bos> token or identification. If suffixes existed based on the prediction token 416, the decoder 406 would generate generation scores for such suffixes.

In accordance with examples of the present disclosure, the decoder 406 may generate modified generation scores for the prediction tokens based on the generation score $g_1$ for the prediction token and the maximum generation score $g_2$ of the future tokens. For example, a modified generation score for the token 414 may be generated according to the following: $g_{1_{modified}}$["the"]=$\lambda \cdot g_1$["the"]+$(1-\lambda) \cdot \max(g_2$["texas"], $g_2$["best"],$g_2$["flight"]) as depicted by reference character 424, where the modified generation score $g_{1_{modified}}$["the"] is equal to the generation score $g_1$["the"]·$\lambda$ plus the maximum generation score $g_2$ from tokens 418, 420, and 422 multiplied by $(1-\lambda)$, where the residual weight $\lambda$ may be set to control the weight of prediction token's generation score and its look-ahead score. The modified generation score $g_{1_{modified}}$ may be associated with the token 414. A modified generation score for token 416 may be generated in a similar manner. Accordingly, a selection of the next prediction token as the next token in the output sequence may be based on the modified generation scores $g_{1_{modified}}$. As further depicted in FIG. 4A, between tokens 414 and 416, token 414 may have the highest modified generation score $g_{1_{modified}}$.

Figure 4B:
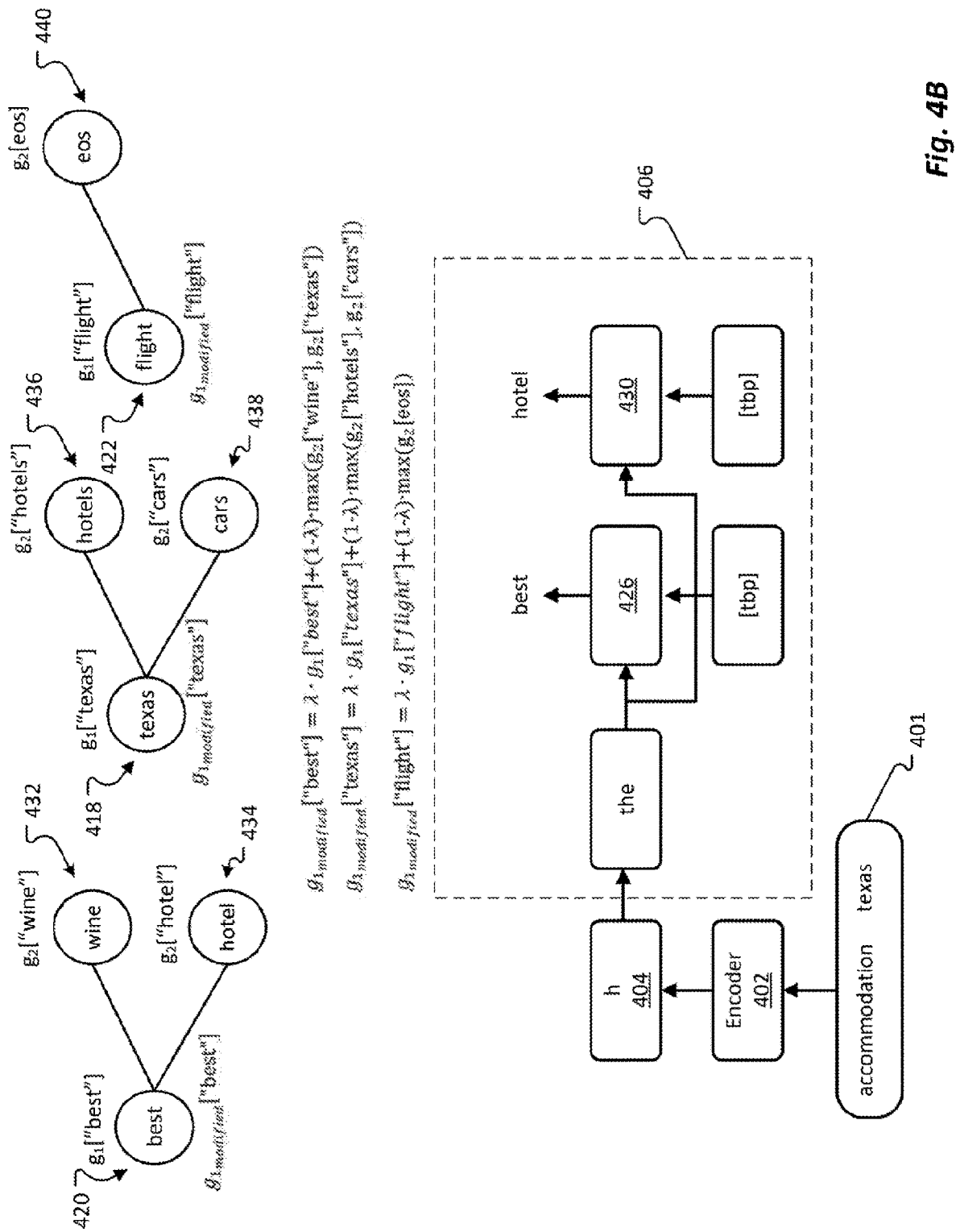
FIG. 4B depicts additional details of a decoding process associated with a Seq2Seq model in accordance with examples of the present disclosure.

Continuing with the example of FIG. 4A, FIG. 4B depicts a subsequent time step where the decoder 406 may simultaneously generate generation scores for a tokens to-be-predicted [tbd] 426 and future tokens to-be-predicted [tbd] 430. The generation score for the tokens to-be-predicted [tbd] 426 may be referred to as $g_1$, and the generation score for the future tokens to-be-predicted [tbd] 430 may be referred to as $g_2$. The previously decoded sequence may be referred to as seq, which as depicted in FIG. 4B may include the sequence of "<start> the" or "<bos>the."

Accordingly, as depicted in FIG. 4B, the decoder 406 may generate a generation score $g_1$["best"] for the next prediction token 420, a generation score $g_1$["texas"] for the next prediction token 418, and a generation score $g_1$["flight] for the next prediction token 422, where prediction tokens 420, 418, and 422 are constrained to a Trie, such as the Trie of FIG. 2E. That is, the generation score $g_1$["best"] may be equal to the probability that the token 420 "best" is the next token in the output sequence given the input sequence 401 and partially decoded output sequence, which as depicted in FIG. 4B may include "<start> the." The generation score $g_1$["texas"] may be equal to the probability that the token 418 "texas" is the next token in the output sequence given the input sequence 401 and partially decoded output sequence, which as depicted in FIG. 4B may include "<start> the." The generation score $g_1$["flight"] may be equal to the probability that the token 422 "flight" is the next token in the output sequence given the input sequence 401 and partially decoded output sequence, which as depicted in FIG. 4B may include "<start> the."

Additionally, the decoder 406 may generate a generation score $g_2$["wine"] for the future token 432, a generation score $g_2$["hotel"] for the future token 434, a generation score $g_2$["hotels"] for the future token 436, a generation score $g_2$["cars"] for the future token 438, and a generation score $g_2$[eos] for the future token 440 which may be an end of sentence identifier, where tokens 432 and 434 are suffixes of the prediction token 420, tokens 436 and 438 are suffixes of the prediction token 418, and token 440 is a suffix the prediction token 422 as indicated by the Trie. The generation scores $g_2$["wine"], $g_2$["hotel"], $g_2$["hotels"], $g_2$["cars"], and $g_2$["flight] may be equal to the probability that the respective token 432, 434, 436, 438, or 440 is the next token in the output sequence given the input sequence 401 and partially decoded output sequence, which as depicted in FIG. 4B may include "<start> the."

As previously described with respect to FIG. 4A, the decoder 406 may generate modified generation scores for the prediction tokens based on the generation score $g_1$ for the prediction token and the maximum generation score $g_2$ of the future tokens. For example, a modified generation score for the token 420 may be generated according to the following: $g_{1_{modified}}$["best"]=$\lambda \cdot g_1$["best"]+$(1-\lambda) \cdot \max(g_2$["wine"],$g_2$["hotel"]), where the modified generation score $g_{1_{modified}}$["best"] is equal to the generation score $g_1$["best"]·$\lambda$ plus the maximum generation score $g_2$ from tokens 432 and 434 multiplied by $(1-\lambda)$, where the residual weight $\lambda$ may be set to control the weight of prediction token's generation score and its look-ahead score. The modified generation score $g_{1_{modified}}$["best"] may be associated with the token 420. Similarly, modified generation scores for tokens 418 and 422 may be generated in a similar manner. Accordingly, a selection of the next prediction token as the next token in the output sequence may be based on the modified generation scores $g_{1_{modified}}$. As further depicted in FIG. 4B, between tokens 418, 420, and 422, token 420 may have the highest modified generation score $g_{1_{modified}}$.

Figure 4C:
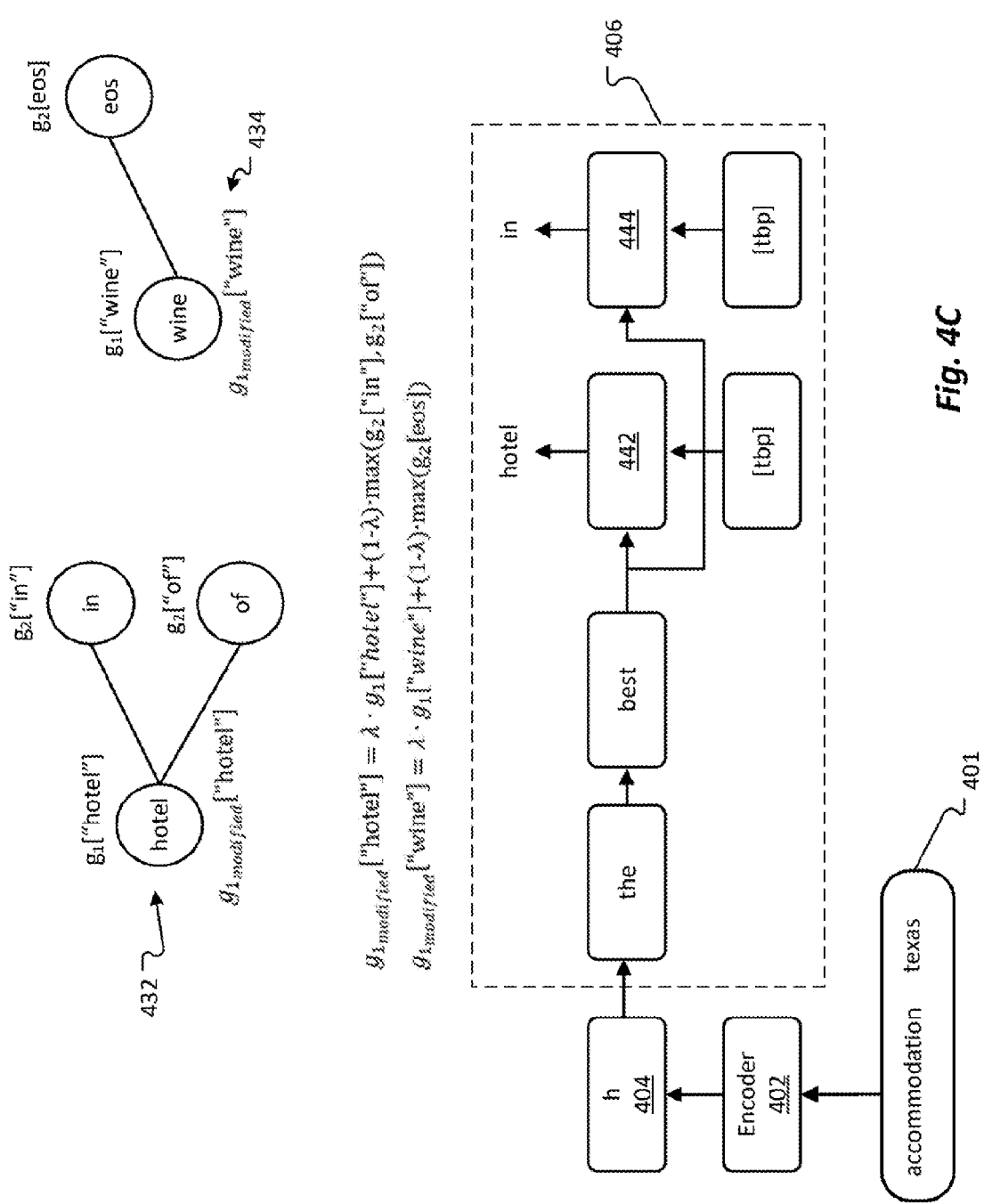
FIG. 4C depicts additional details of a decoding process associated with a Seq2Seq model in accordance with examples of the present disclosure.

Continuing with the example of FIGS. 4A and FIG. 4B, FIG. 4C depicts a subsequent time step where the decoder 406 may simultaneously generate generation scores for a tokens to-be-predicted [tbd] 442 and future tokens to-be-predicted [tbd] 444. The generation score for the tokens to-be-predicted [tbd] 442 may be referred to as $g_1$, and the generation score for the future tokens to-be-predicted [tbd] 444 may be referred to as $g_2$. The previously decoded sequence may be referred to as seq, which as depicted in FIG. 4C may include the sequence of "<start> "the best."

Accordingly, as depicted in FIG. 4C, the decoder 406 may generate a generation score $g_1$["hotel"] for the next prediction token 432 and a generation score $g_1$["wine] for the next prediction token 434, where prediction tokens 432 and 434 are constrained to a Trie as the next suffixes along a Trie path.

Additionally, the decoder 406 may generate a generation score $g_2$["in"] and a generation score $g_2$["of"] the look-ahead tokens of 432. The decoder may generate a generation score $g_2$[eos] for the look-ahead token 434. As previously described with respect to FIGS. 4A and 4B, the decoder 406 may generate modified generation scores for the prediction tokens based on the generation score $g_1$ for the prediction token and the maximum generation score $g_2$ of the future tokens. For example, a modified generation score for the token 432 may be generated according to the following: $g_{1_{modified}}$["hotel"]=$\lambda \cdot g_1$["hotel"]+$(1-\lambda) \cdot \max(g_2$["in"],$g_2$["of"]), where the modified generation score $g_{1_{modified}}$["hotel"]

is equal to the generation score $g_1$["hotel"]·λ plus the maximum of the generation scores $g_2$["in"] and $g_2$["of"] multiplied by (1−λ), where the residual weight λ may be set to control the weight of prediction token's generation score and its look-ahead score. The modified generation score $g_{1_{modified}}$["hotel"] may be associated with the token 432. Similarly, modified generation scores for tokens 434 may be generated in a similar manner. Accordingly, a selection of the next prediction token as the next token in the output sequence may be based on the modified generation scores $g_{1_{modified}}$. As further depicted in FIG. 4C, between tokens 432 and 434, token 432 may have the highest modified generation score $g_{1_{modified}}$.

Figure 4D:
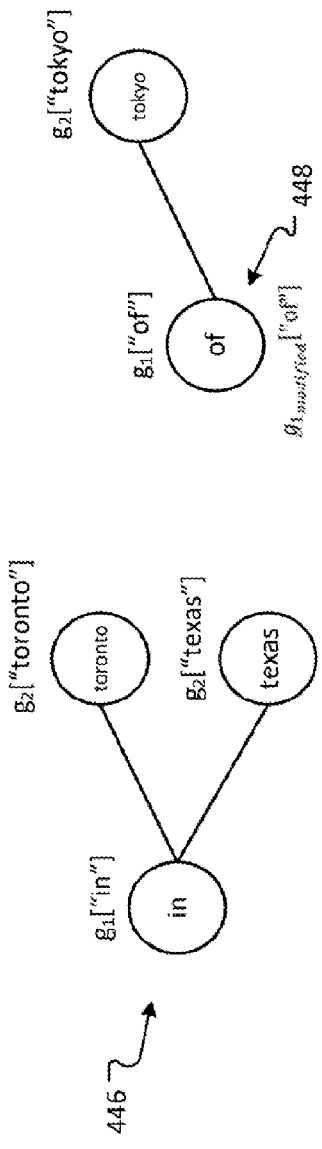
FIG. 4D depicts additional details of a decoding process associated with a Seq2Seq model in accordance with examples of the present disclosure.
Figure 4D:
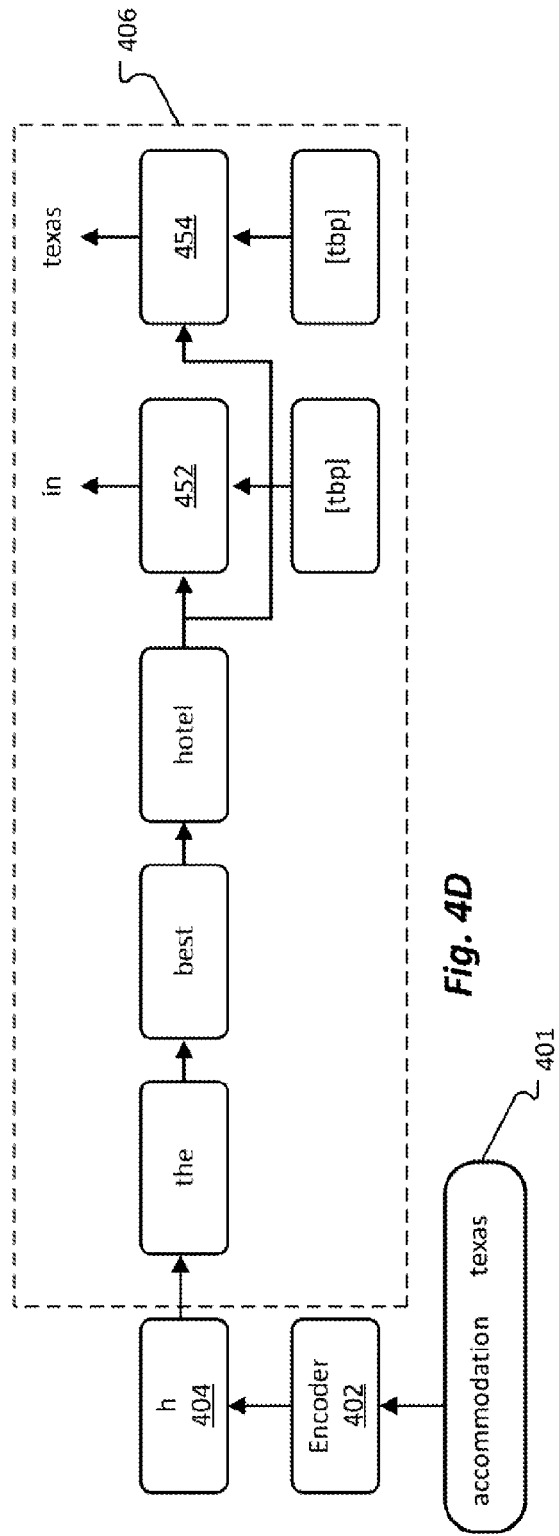

Continuing with the example of FIGS. 4A-4C, FIG. 4D depicts a subsequent time step where the decoder 406 may simultaneously generate generation scores for a tokens to-be-predicted [tbd] 452 and future tokens to-be-predicted [tbd] 454. The generation score for the tokens to-be-predicted [tbd] 452 may be referred to as $g_1$, and the generation score for the future tokens to-be-predicted [tbd] 454 may be referred to as $g_2$. The previously decoded sequence may be referred to as seq, which as depicted in FIG. 4D may include the sequence of "<start> "the best hotel.""

Accordingly, as depicted in FIG. 4D, the decoder 406 may generate a generation score $g_1$["in"] for the next prediction token 446 and a generation score $g_1$["of"] for the next prediction token 448, where prediction tokens 446 and 448 are constrained to a Trie as the next suffixes along a Trie path.

Additionally, the decoder 406 may generate a generation score $g_2$["toronto"] and a generation score $g_2$["texas"] for the look-ahead tokens of token 446. The decoder may generate a generation score $g_2$["tokyo"] for the look-ahead token 448. As previously described with respect to FIGS. 4A-4C, the decoder 406 may generate modified generation scores for the prediction tokens based on the generation score $g_1$ for the prediction token and the maximum generation score $g_2$ of the future tokens. For example, a modified generation score for the token 446 may be generated according to the following: $g_{1_{modified}}$["in"]=λ·$g_1$["in"]+(1−λ)·max($g_2$["toronto"],$g_2$["texas"]), where the modified generation score $g_{1_{modified}}$["in"] is equal to the generation score $g_1$["in"] ·λ plus the maximum of the generation scores $g_2$["toronto"] and $g_2$["texas"] multiplied by (1−λ), where the residual weight λ may be set to control the weight of prediction token's generation score and its look-ahead score. The modified generation score $g_{1_{modified}}$["in"] may be associated with the token 446.

Similarly, modified generation scores for the token 448 may be generated in a similar manner. Accordingly, a selection of the next prediction token as the next token in the output sequence may be based on the modified generation scores $g_{1_{modified}}$. As further depicted in FIG. 4D, between tokens 446 and 448, token 446 may have the highest modified generation score $g_{1_{modified}}$. When generating the next token for "the best hotel", "in" and "of" are suffix tokens according to the Trie. Though both "in" and "of" are generally good suffixes to generate keyword, "of" has no future tokens having a high generation score, while the future tokens of "in" cover a desired token "texas" providing a high generation score for "texas" and a higher modified generation score for "in." Thus "in" is generated.

Figure 4E:
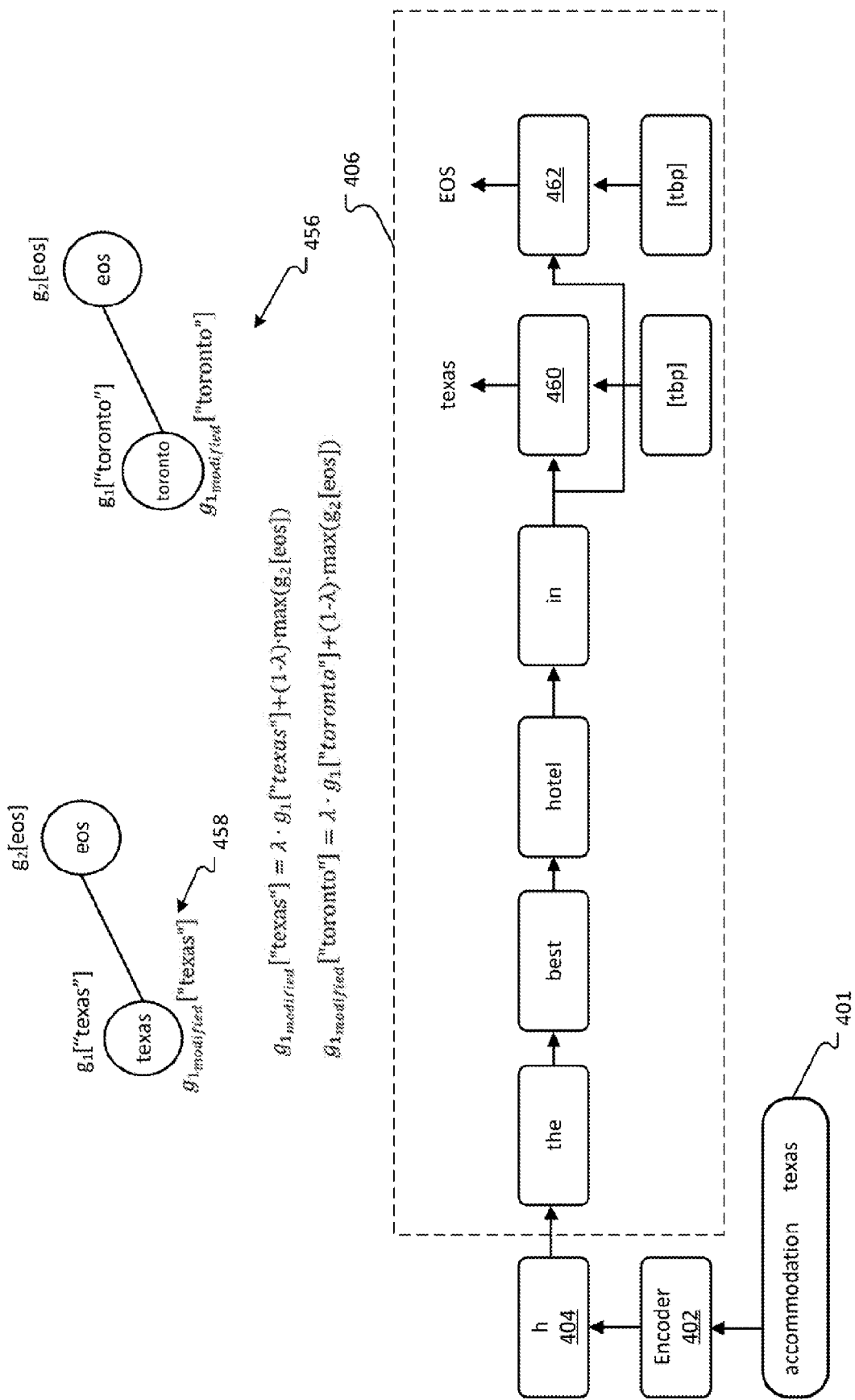
FIG. 4E depicts additional details of a decoding process associated with a Seq2Seq model in accordance with examples of the present disclosure.

Continuing with the example of FIGS. 4A-4D, FIG. 4E depicts a subsequent time step where the decoder 406 may simultaneously generate generation scores for a tokens to-be-predicted [tbd] 460 and future tokens to-be-predicted [tbd] 462. The generation score for the tokens to-be-predicted [tbd] 460 may be referred to as $g_1$, and the generation score for the future tokens to-be-predicted [tbd] 462 may be referred to as $g_2$. The previously decoded sequence may be referred to as seq, which as depicted in FIG. 4E may include the sequence of "<start> "the best hotel in.""

Accordingly, as depicted in FIG. 4D, the decoder 406 may generate a generation score $g_1$["texas"] for the next prediction token 458 and a generation score $g_1$["toronto"] for the next prediction token 456, where prediction tokens 458 and 456 are constrained to a Trie as the next suffixes along a Trie path.

Additionally, the decoder 406 may generate a generation scores $g_2$[eos] for respective look ahead tokens of tokens. As previously described with respect to FIGS. 4A-4D, the decoder 406 may generate modified generation scores for the prediction tokens based on the generation score $g_1$ for the prediction token and the maximum generation score $g_2$ of the future tokens. For example, a modified generation score for the token 458 may be generated according to the following: $g_{1_{modified}}$["texas"]=λ·$g_1$["texas"]+(1−λ)·max($g_2$[eos]). Similarly, modified generation scores for the token 456 may be generated in a similar manner. Accordingly, a selection of the next prediction token as the next token in the output sequence may be based on the modified generation scores $g_{1_{modified}}$. As further depicted in FIG. 4E, between tokens 458 and 456, token 458 may have the highest modified generation score $g_{1_{modified}}$. In addition, the token 458 covers a desired token "texas" that was provided in the input sequence 401. As the next suffix in the Trie based on the path that includes "the best hotel in texas" is an end of sentence identifier, the decoder 406 may output the decoded sequence "the best hotel in texas" as a possible candidate sequence.

In some examples, a size of the beam search (e.g., beam width) may determine how many results having the greatest modified generation score may be passed to a parent node and/or how many Trie paths may be traversed at any one time. For example, a beam search having a beam width equal to two may allow both the token 418 and the token 420 to be selected as a possible addition to the decoded sequence. Alternatively, or in addition, only the token associated with the highest modified generation score may be selected as an addition to the decoded sequence. In some examples, the consideration of a high-confidence suffix may occur before explicitly looking forward. For example, if no high-confidence look-ahead tokens exist, a low future score may be passed backward. Conversely, if there are any noise tokens in a suffix having high-confidence look-ahead tokens, further high-confidence scores will be passed across the "noise" (e.g., token of low generation score) to provide an enhanced modified generation score for the token being predicted.

The use of the modified generation scores may be used to rank and select the best sequences. In instances where the $g_{1_{modified}}$ scores are used to calculate decoded sequence scores utilizing a beam searching technique, the results may be inconsistent with a generation model that does not employ a look-ahead strategy. That is, the look-ahead strategy modifies the scores of the output sequences which may lead to error accumulation. Thus, the modified generation scores $g_{1_{modified}}$ may be used to rank and select the best sequences having a highest score, but the generation scores $g_1$ (e.g., original generation scores without adopting a look-ahead strategy) may be stored and used in the selection of the next prediction token.

Figure 5:
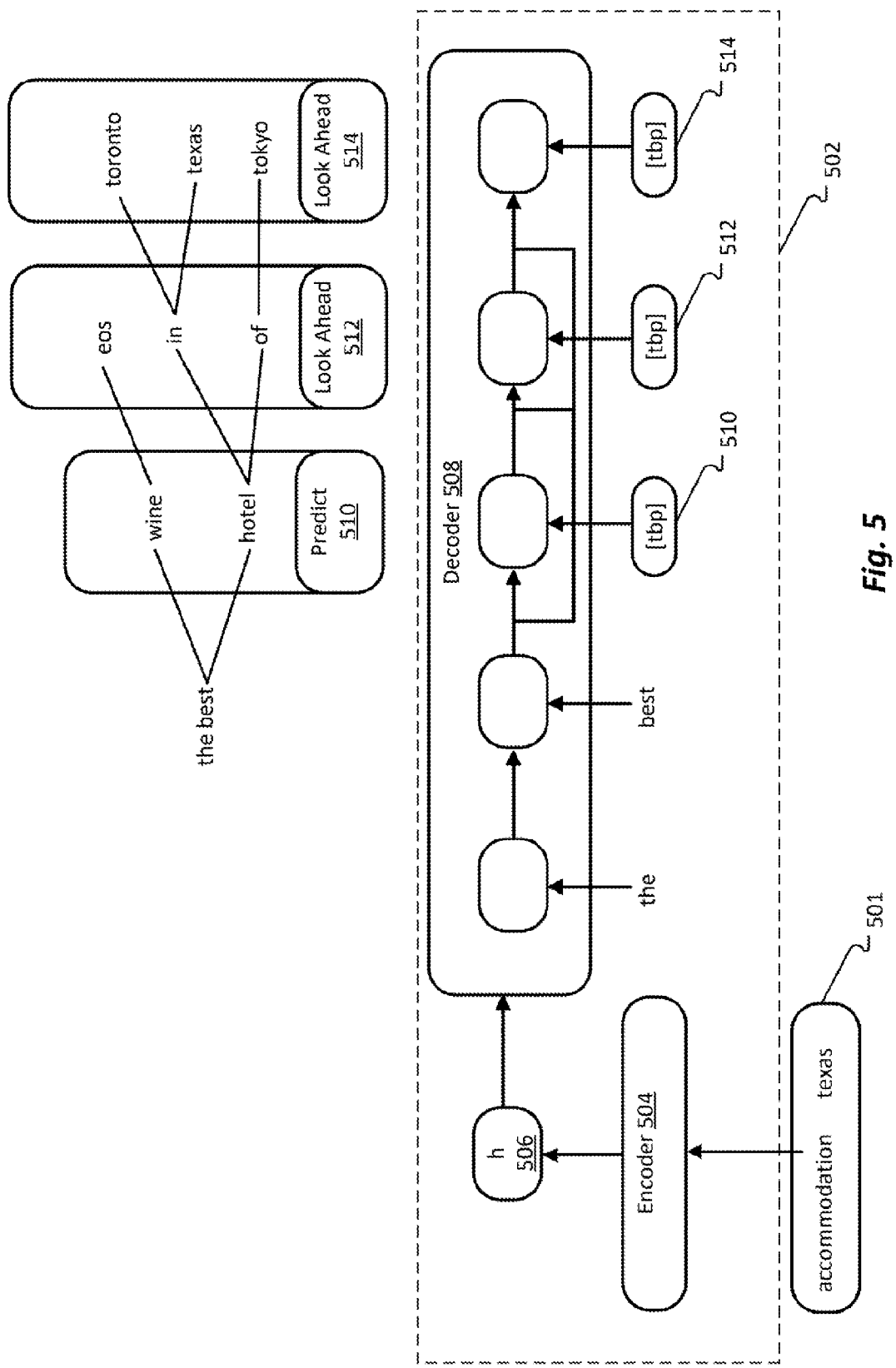
FIG. 5 depicts details of a decoding process associated with a Seq2Seq model in accordance with examples of the present disclosure.

FIG. 5 depicts additional details of a decoding process 500 associated with a Seq2Seq model 504 in accordance with examples of the present disclosure. In examples, FIG. 5 differs from FIG. 3 in that the decoder of the Seq2Seq model 502 may provide generation scores for a prediction token 510 and two look-ahead tokens 512 and 514, where a first look-ahead token 512 is a suffix of the prediction token 510 and the second look-ahead token 514 is a suffix of the first look-ahead token 512. As previously mentioned, the predicted next tokens and the predicted future tokens may be constrained to the words in a Trie, and more specifically, along a path in a Trie.

Figure 6:
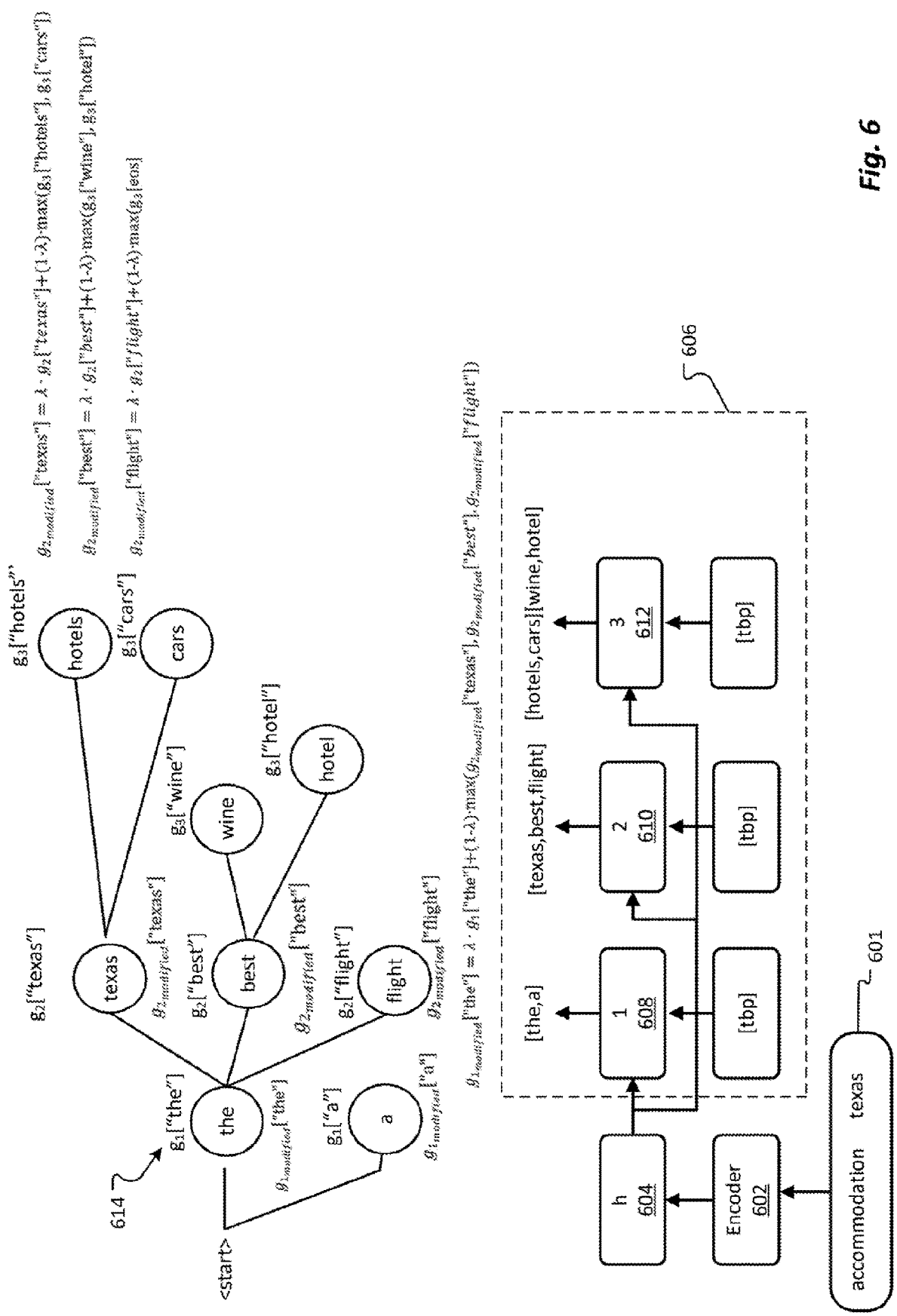
FIG. 6 depicts additional details of a decoding process associated with a Seq2Seq model in accordance with examples of the present disclosure.

FIG. 6 depicts additional details directed to a decoding process associated with the Seq2Seq model of FIG. 5 in accordance with examples of the present disclosure. The encoder 602 may be the same as or similar to the encoder 308 previously discussed. The encoder 602 may receive an input sequence 601 and encode the input sequence into a source sequence representation h 604. The decoder 606 may be the same as or similar to the decoder 312 as previously discussed. In accordance with examples of the present disclosure, the generation scores of the next prediction tokens may be modified by looking ahead to one or more future token's score based on a prior predicted segment. As depicted in FIG. 6A, the decoder 606 may simultaneously generate generation scores for a token to-be-predicted [tbd] 608, a future token to-be-predicted [tbd] 610, and another future token to-be-predicted 612, where the future token to-be-predicted 612 is a suffix of the token to-be-predicted [tbd] 610. The generation score for the token to-be-predicted [tbd] 608 may be referred to as $g_1$, the generation score for the future token to-be-predicted [tbd] 610 may be referred to as $g_2$, and the generation score for the future token to-be-predicted 612 may be referred to as $g_3$. Accordingly, an example modified generation score for taken 614 may be:

$$g_{1_{modified}}[\text{"the"}] = \lambda \cdot g_1[\text{"the"}] + (1-\lambda) \cdot \max(g_{2_{modified}}[\text{"texas"}], g_{2_{modified}}[\text{"best"}], g_{2_{modified}}[\text{"flight"}])$$

As FIGS. 2A-4E provide an example where a selected word to be added to an output sequence is based on a predicted token and a suffix of the predicted token, and FIGS. 5 and 6 provide an example where a selected word to be added to an output sequence is based on a predicted token, a suffix of the predicted token, and a suffix of the suffix of the predicted token, it is contemplated that any number of future look-ahead tokens may be utilized to select a next word in an output sequence. An example recursive algorithm for generating and ranking a token and therefore a generated text segment based on an input sequence is provided in Table 1.

Figure 7:
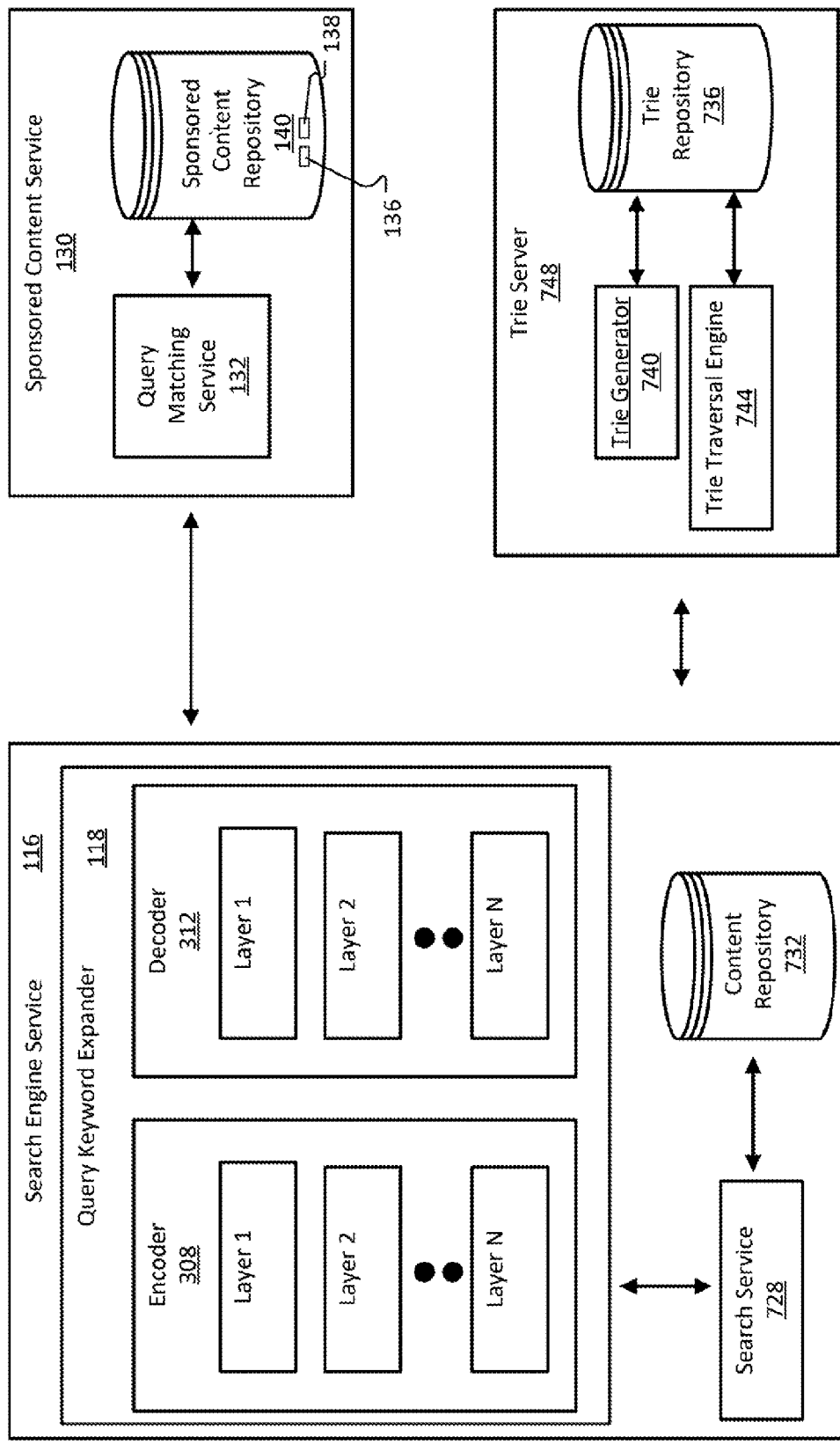
FIG. 7 depicts additional details of a search engine service, sponsored content service, and Trie server in accordance with examples of the present disclosure.

TABLE 1 input : Beam Size b, n-gram P, Trie T, Residual weight λ, Input query X, max output token length l
output: Keywords extensions π
alive buffer: H ← ∅ ; finished buffer: π ← ∅ ; // with [hypothesis, scores] put [bos, score bos] in H ; // Initialize the alive buffer
while best alive score ≥ worst alive score and decoded length < l
do
  $O_{sen}$ ← ∅ ;   // Original sentence scores to be stored in H
  $M_{sen}$ ← ∅ ; //Modified sentence scores to be ranked temporarily
  for seq in H do
    [$g_1,g_2,...,g_n$] ← P(seq, X) ; // Next future n tokens' scores
    $s_1,m_1$ ← T (seq) ; // $s_1$: suffix tokens, $m_1$: mask vector
    $O_{token} = M_{token} = g_1 + m_1$ ; // Mask the tokens out of Trie
    for $\rho_1$ in $s_1$ ;                          // Start looking ahead
    do
      $s_2,m_2$ ← T (seq + $\rho_1$) ;
      for $\rho_2$ in $s_2$ ; // May be replaced with recursive function
      do
        $s_3,m_3$ ← T (seq + $\rho_1$ + $\rho_2$) ;
        for $\rho...$ in $s...$ do
          ...,
          for $\rho_{n-1}$ in $s_{n-1}$ do TABLE 1-continued // Modify scores from the farthest nodes
            $s_n, m_n$ ← T (seq +$\rho_1$ + $\rho_2$ + ... + $\rho_{n-1}$);
            $g_{n-1}[\rho_{n-1}] = \lambda \times g_{n-1}[\rho_{n-1}] + (1 - \lambda) \times \max(g_n + m_n)$;
            end
      ...;
      end
      $g_2[\rho_2] = \lambda \times g_2[\rho_2] + (1 - \lambda) \times \max(g_3 + m_3)$;
    end
    // Modify scores until the next first token
    $M_{token}[\rho_1] = \lambda \times O_{token}[\rho_1] + (1 - \lambda) \times (\max(g_2 + m_2))$;
  end
  // Calculate new sentence scores with previous decoded score
      and next first tokens' step score
  O ← func(seq.score, $O_{token}$) put O into $O_{sen}$ ; // Original scores
  M ← func(seq.score, $M_{token}$) put M into $M_{sen}$ // Modified scores
  end
  // Rank with modified scores but store their original scores
  new seqs, id ← top b of ($M_{sen}$) ;
  new finished seqs, id f ← top b of (π.scores, $M_{sen}$.cos) ;
  H ← new seqs, $O_{sen}$[id] ;
  π ← new finished seqs, $O_{sen}$[id f ];
end
return π;

FIG. 7 depicts additional details of the search engine service 116, sponsored content service 130, and Trie server 748 in accordance with examples of the present disclosure. As previously discussed, the search engine service 116 may provide content to a computing device based on a received query, such as the query 702. For example, the search engine service 116 may receive the query 702 at the search service 728 and identify content that matches or otherwise is similar to the query 702 using the search service 728. In some examples, a search index of indexed content which may be located in a content repository 732 may be utilized to determine the content that matches or otherwise is similar to the query 702. The search engine service 116 may then assemble results and provide the assembled results to the computing device. The content may also include one or more advertisements, or ads, that are rendered at the display of the computing device in response to the query 702.

To identify sponsored content that is to be provided as part of the content rendered to a display, the search engine service 116 may include a query keyword expander 118 which receives the query 702 and expands the query 702 into a plurality of contextually aware text segments. The query keyword expander 118 may utilize a Seq2Seq model that employs an encoder 308 which encodes the query as a source sequence representation, and a decoder 312 which provides one or more text segments as a conditional likelihood based on the source sequence representation and previous predicted segments, such as words, as inputs. As previously described, the encoder 308 may be a multi-layer encoder and the decoder may be a multi-layer decoder. The plurality of expanded text segments may be provided to a sponsored content service 130 which receives the plurality of expanded text segments and uses a query matching service 132 to identify sponsored content associated with the plurality of expanded text segments. For example, the query matching service may determine sponsored content to display based on the plurality of expanded text segments and a plurality of keywords 136 associated with sponsored content 138 in a sponsored content repository 140. In some examples, sponsored content may be an advertisement. The plurality of keywords 136 may correspond to a plurality of keyword bids that have been placed by or otherwise associated with sponsors; accordingly, sponsored content associated with a sponsor having a highest bid for a keyword or keywords matching one or more text segments in the plurality of expanded text segments may be provided in response to the query 702. Thus, the sponsored content service 130 may provide sponsored content to the search engine service 116 such that the search engine service 116 provides the sponsored content as part of a response to the user entered query 702. Accordingly, the sponsored content may be provided in addition to other content and may be rendered to a display of the computing device.

In some examples, the query keyword expander 118 may provide, or generate, the plurality of expanded text segments based on a vocabulary, where the vocabulary may include a plurality of text segments. The plurality of text segments may correspond to the keywords having keyword bids and may be arranged as a Trie as previously described. The Trie may reside in the Trie repository 736 and may be generated, changed, or modified using the Trie generator 740. The Trie may also be traversed using a Trie traversal engine 744. The Trie server 748 may provide access to the generation and traversal of the Trie data structure.

Figure 8:
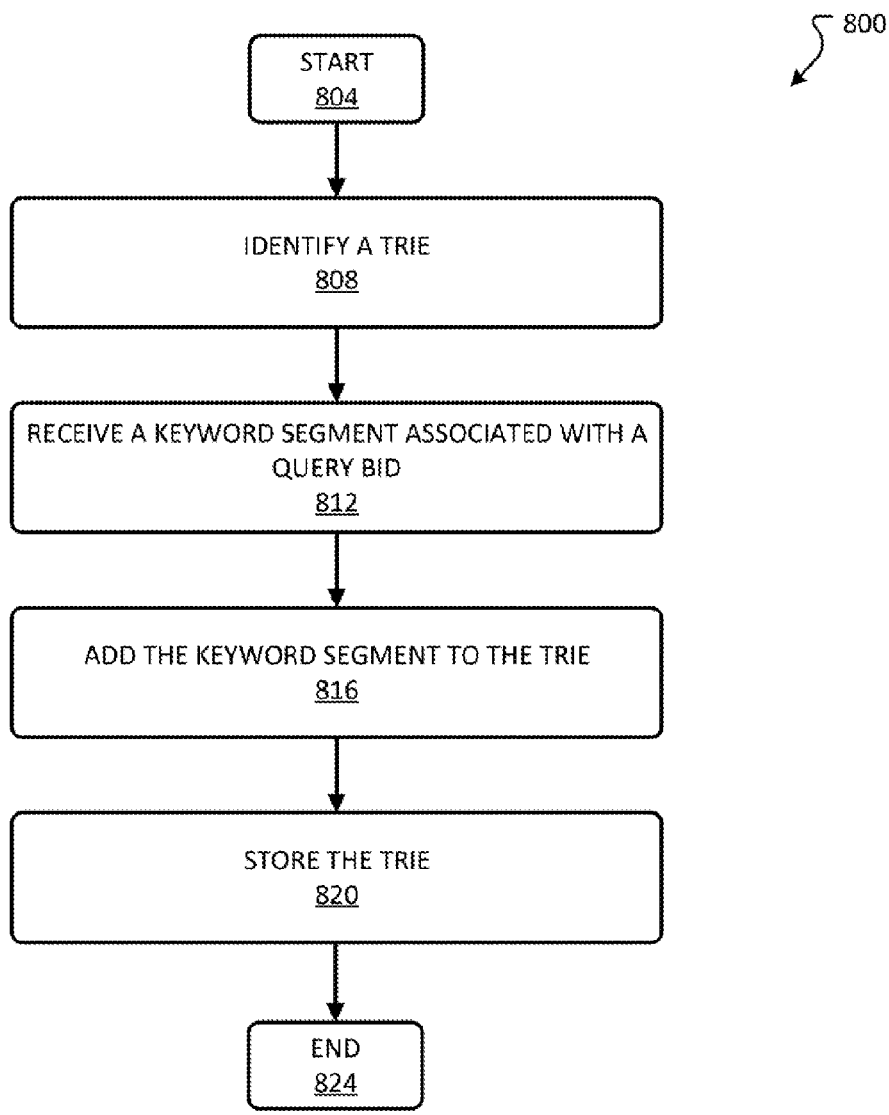
FIG. 8 depicts details of a first method in accordance with examples of the present disclosure.

FIG. 8 illustrates an overview of an example method 800 for receiving a keyword segment associated with a query bid and adding the received keyword segment to a Trie. A general order for the steps of the method 800 is shown in FIG. 8. Generally, the method 800 starts at 802 and ends at 824. The method 800 may include more or fewer steps or may arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, Application Specific Integrated Circuit (ASIC), a field programmable gate array (FPGA), a system on chip (SOC), graphics processing unit (GPU), or other hardware device. Hereinafter, the method 800 shall be explained with reference to the systems, components, modules, software, data structures, user interfaces, etc. described in conjunction with FIGS. 1-7.

The method 800 begins at operation 804, where an indication that a keyword segment is to be added to Trie may be received. For example, a sponsor may bid on a keyword or keywords. Once a bid has been established, the keyword or keywords may be added to the Trie. Accordingly, the method 800 may proceed to 808 where a Trie that will be receiving the keyword or segment of keywords may be identified. In some examples, the Trie may include a vocabulary from all keyword segments for a sponsored search provider. For example, a sponsored search provider, such as a search engine, may store all keywords and/or segments of keywords as a vocabulary in a single Trie. Alternatively, or in addition, a sponsored search provider may segment the Trie based on a search category, or grouping. In examples, the Trie may reside in the Trie Repository 376. The method 800 may proceed to 812, where the keyword(s) associated with a query bid may be received. More specifically, a Trie server 364 for example may receive the keyword(s) and add the keyword(s) to an existing Trie at step 816 using the Trie generator 368. Accordingly, the Trie having the received keyword(s) may be stored in a Trie repository, such as the Trie repository 736 at step 820. Once stored, the method 800 may end at 824.

Figure 9:
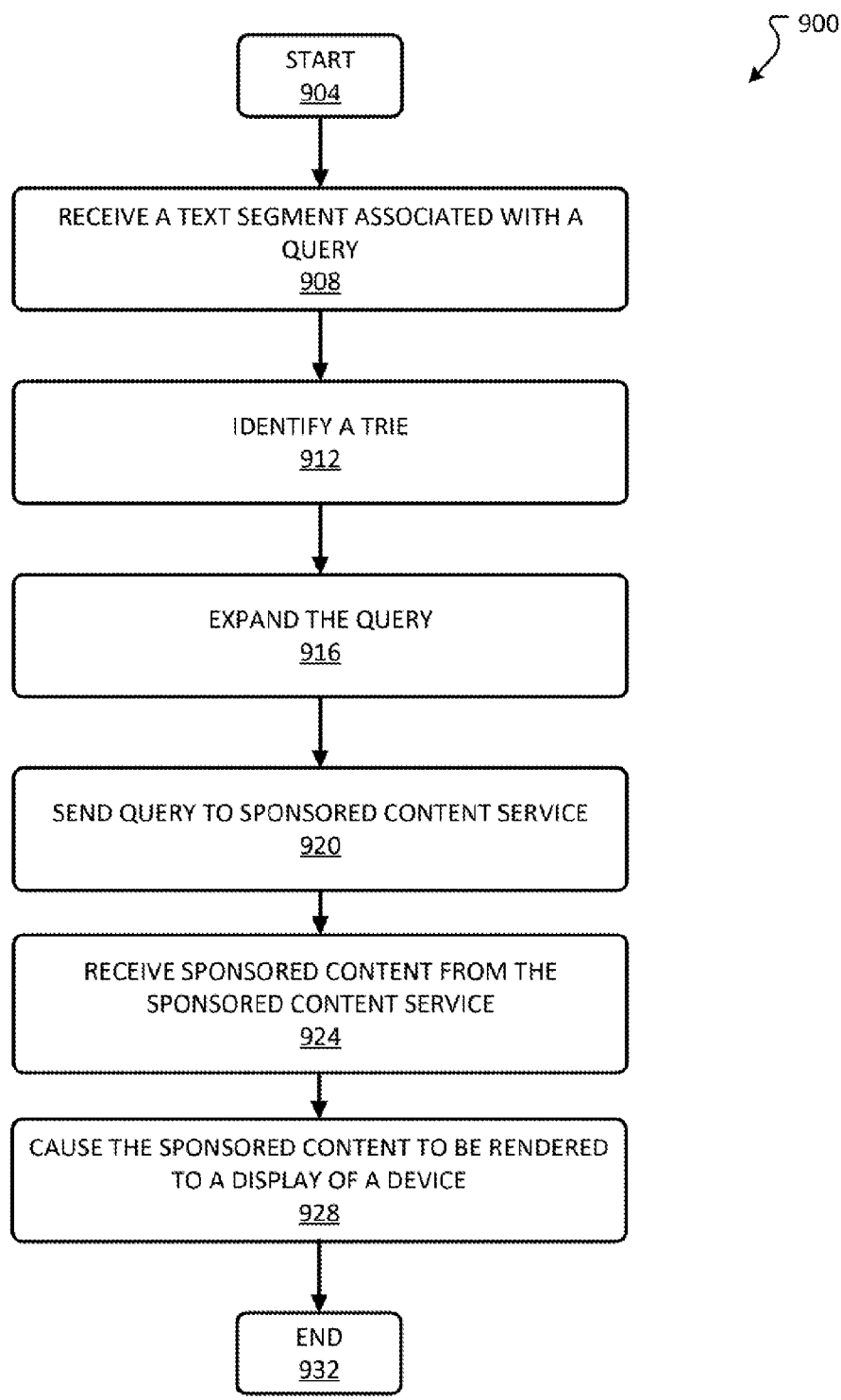
FIG. 9 depicts details of a second method in accordance with examples of the present disclosure.

FIG. 9 illustrates an overview of an example method 900 for identifying sponsored content to be displayed at a computing device based on a query. A general order for the steps of the method 900 is shown in FIG. 9. Generally, the method 900 starts at 904 and ends at 932. The method 900 may include more or fewer steps or may arrange the order of the steps differently than those shown in FIG. 9. The method 900 can be executed as a set of computer-executable instructions executed by a computer system and encoded or stored on a computer readable medium. Further, the method 900 can be performed by gates or circuits associated with a processor, Application Specific Integrated Circuit (ASIC), a field programmable gate array (FPGA), a system on chip (SOC), graphics processing unit (GPU), or other hardware device. Hereinafter, the method 900 shall be explained with reference to the systems, components, modules, software, data structures, user interfaces, etc. described in conjunction with FIGS. 1-8.

The method 900 begins at operation 904 and proceeds to operation 908 where a text segment associated with a query is received. The method may proceed to 912 to identify a Trie containing a vocabulary for use with expanding or otherwise generating a plurality of text segments associated with the query. In examples, the plurality of text segments may be considered to be an expanded listing of text segments associated with the query. The method may proceed to 916 where additional text segments are generated in accordance with the examples described herein. For example, the query keyword expander 118 may encode the received text segment using the encoder 308 and provide the encoded text segment to the decoder 312. The decoder 312 may generate a score for one or more nodes in the identified Trie. The score may be based on the look-ahead prediction method as previously described and/or as described with respect to FIG. 10. Once the plurality of text segments have been generated, the method 900 may proceed to operation 920 where one or more of the generated text segments may be sent to an sponsored content service, such as the sponsored content service 130. The sponsored content service 130 for example, may match the one or more generated text segments to sponsored content and/or keywords associated with sponsored content, and send the sponsored content to the search engine service 116. The method 900 may proceed to 928, where the search engine service 116 may provide the add to a computing device thereby causing the sponsored content to be rendered to a display associated with the computing device. The method 900 may then end at 932.

Figure 10:
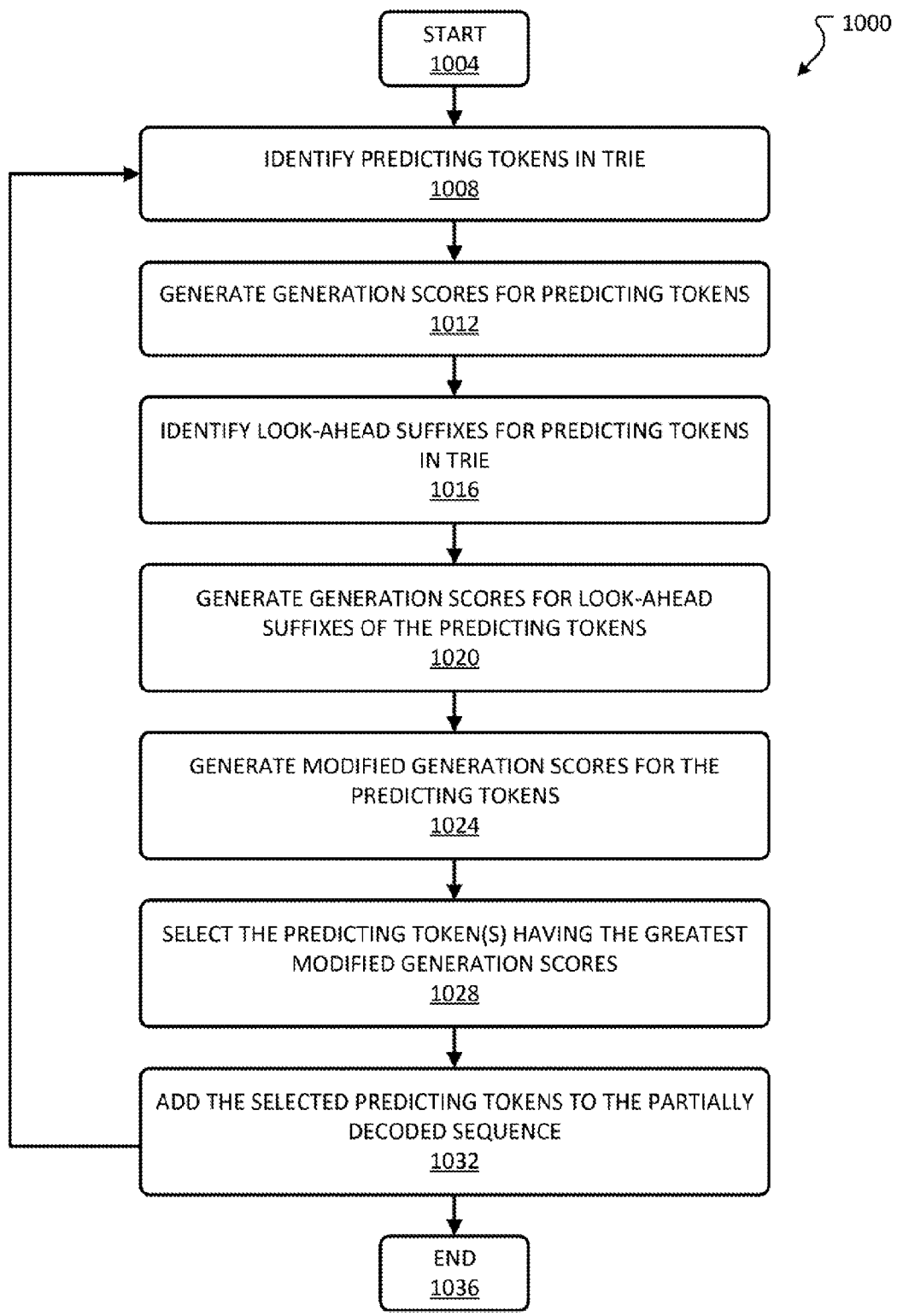
FIG. 10 depicts details of a third method in accordance with examples of the present disclosure.

FIG. 10 illustrates an overview of an example method 1000 for generating an output sequence based on an input sequence. A general order for the steps of the method 1000 is shown in FIG. 10. Generally, the method 1000 starts at 1004 and ends at 1036. The method 1000 may include more or fewer steps or may arrange the order of the steps differently than those shown in FIG. 10. The method 1000 can be executed as a set of computer-executable instructions executed by a computer system and encoded or stored on a computer readable medium. Further, the method 1000 can be performed by gates or circuits associated with a processor, Application Specific Integrated Circuit (ASIC), a field programmable gate array (FPGA), a system on chip (SOC), graphics processing unit (GPU), or other hardware device. Hereinafter, the method 1000 shall be explained with reference to the systems, components, modules, software, data structures, user interfaces, etc. described in conjunction with FIGS. 1-9.

The method 1000 begins at operation 1004 and proceeds to operation 11008 where prediction tokens based on a received decoded partial hypothesis may be identified. More specifically, the decoded partial hypothesis may correspond to an intermediate output sequence that has been generated by a decoder, such as decoder 312, based on an input sequence encoded by an encoder, such as encoder 308. Accordingly, the decoder may provide a prediction of a plurality of next prediction tokens. For each prediction token that resides in a Trie, the decoder may generate a generation score or the prediction token at 1012. In some instances, the decoder may generate the generation score when initially providing a prediction of the next prediction tokens constrained by the Trie. In other examples, the decoder may first look to the Trie to determine the next prediction tokens and generate the generation scores based on the identified prediction tokens.

The method 1000 may proceed to 1016 where look-ahead suffixes for the prediction tokens are identified such that generation scores for the identified look-ahead suffixes may be generated at 1020. In some instances, the decoder may generate the generation score when initially providing a prediction of the next prediction tokens and look-head suffixes constrained by the Trie. In other examples, the decoder may first look to the Trie to determine the next prediction tokens and look-ahead tokens and generate the generation scores based on the identified prediction tokens and look-ahead tokens. The method 1000 may proceed to 1024 where modified generation scores for the prediction tokens may be generated. As previously discussed with respect to FIGS. 3-6, the decoder may generate modified generation scores for the prediction tokens based on the generation score $g_1$ for the prediction token and the maximum generation score $g_2$ of the future tokens. The method 1000 may then proceed to 1028 whereby one or more prediction tokens having the greatest modified generation scores may be selected.

In some examples, where a greedy search is utilized, only the prediction token having the greatest modified generation score is selected. In examples where a beam search may be utilized, the top x prediction tokens have the greatest modified generation score may be selected, where x is equal to a beam width of the beam search. Accordingly, the method 1000 may proceed to 1032, where the selected prediction token(s) are added to the partially decoded sequence. The method 1000 may repeat at 1008 depending on a path length of the Trie for example or a maximum text segment length. For example, where additional tokens are in a Trie path, the method 1000 may proceed to 1008 to generate the next segment, or word, in the partially decoded sequence. Where an end of sentence is encountered as a prediction token or as a look-ahead suffix, the method 1000 may end at 1036.

Figure 11:
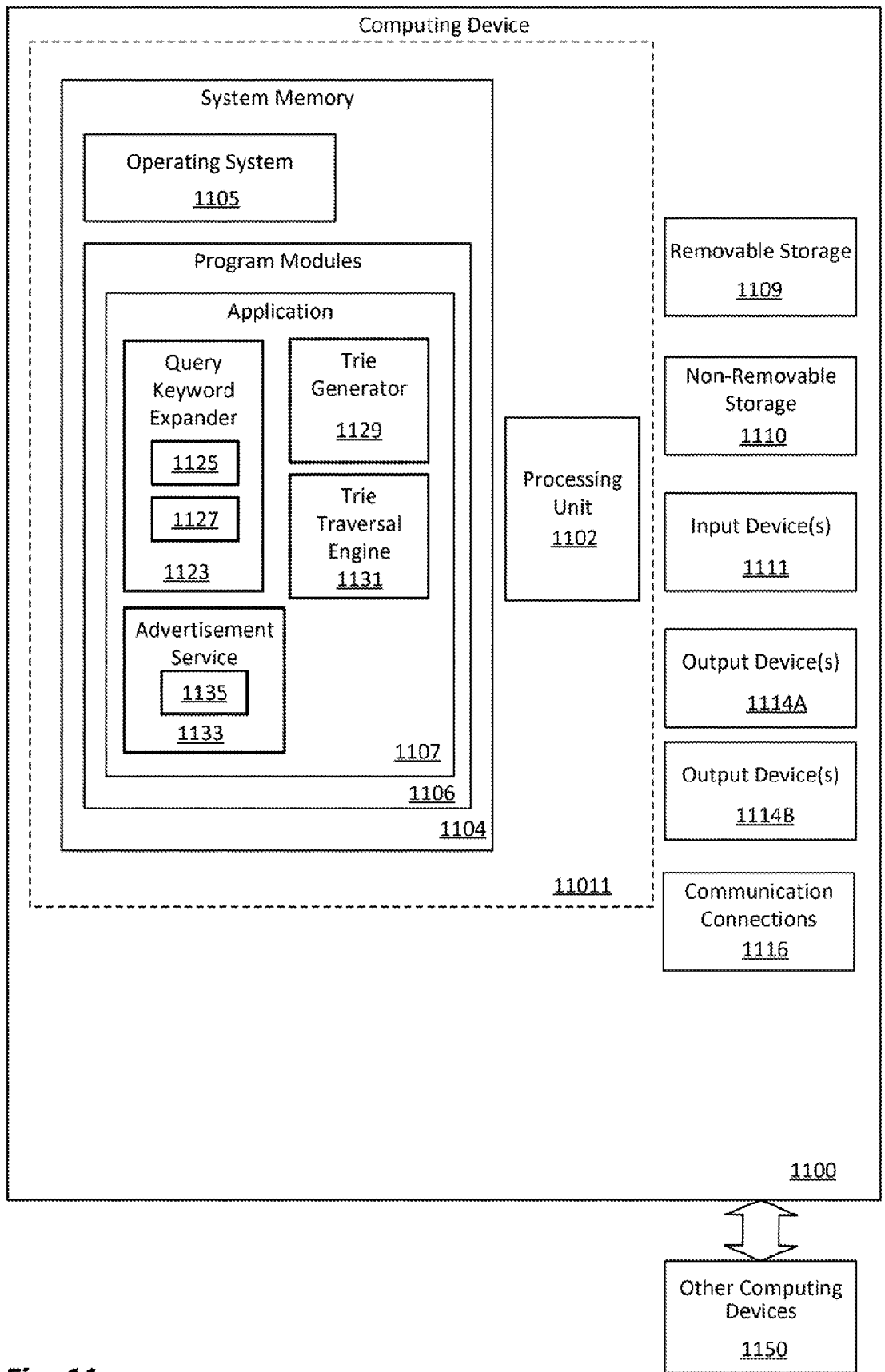
FIG. 11 depicts details of a fourth method in accordance with examples of the present disclosure.
Figure 12A:
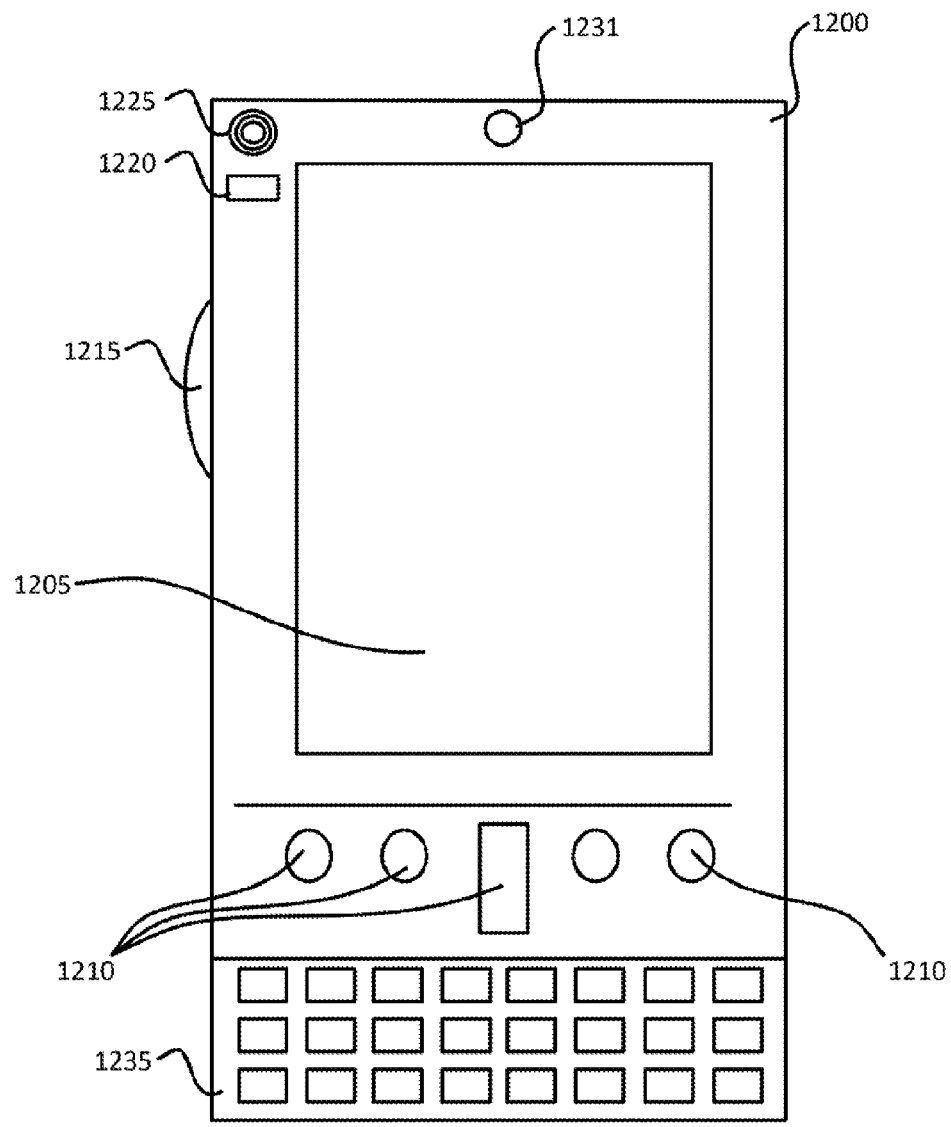
FIG. 12A illustrate a mobile computing device with which embodiments of the disclosure may be practiced.
Figure 12B:
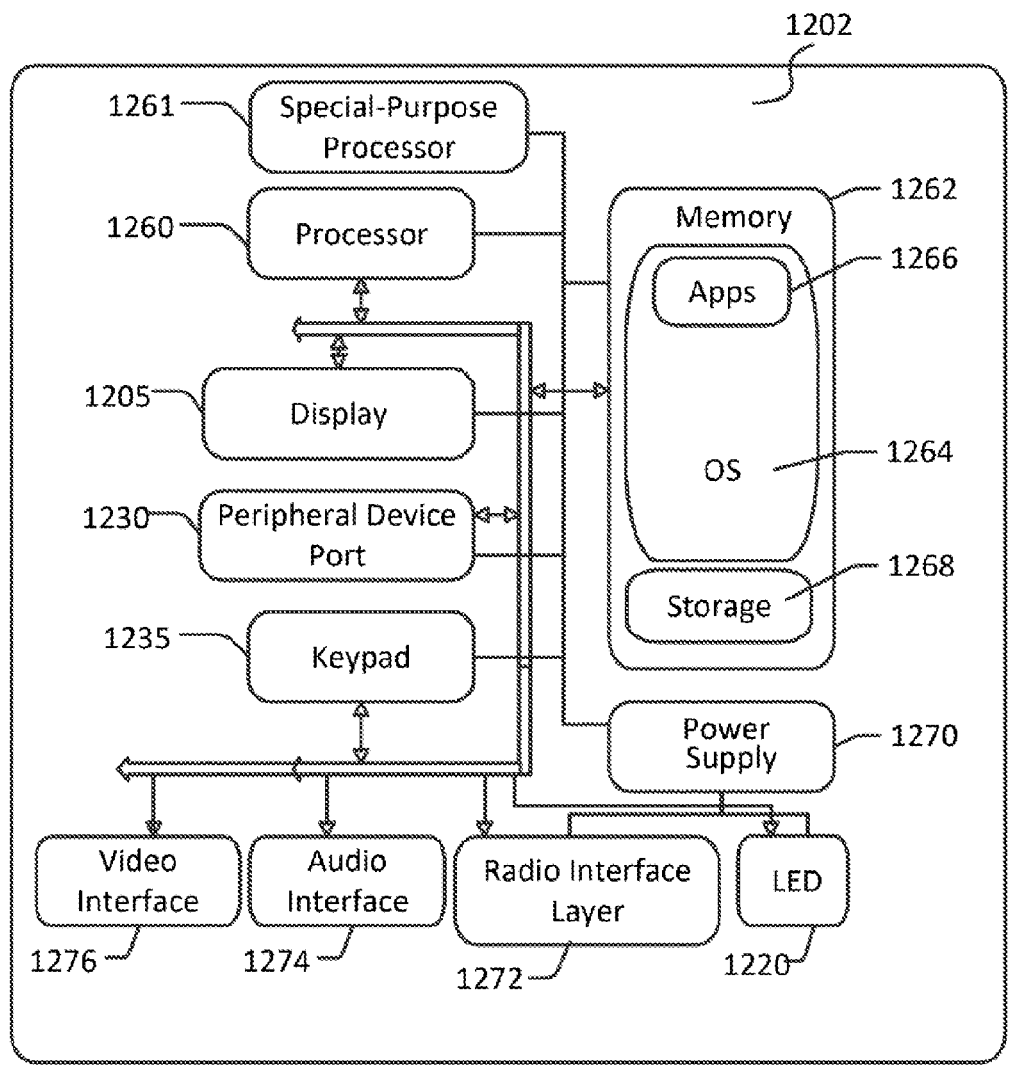
FIG. 12B illustrate additional details of a mobile computing device with which embodiments of the disclosure may be practiced.
Figure 13:
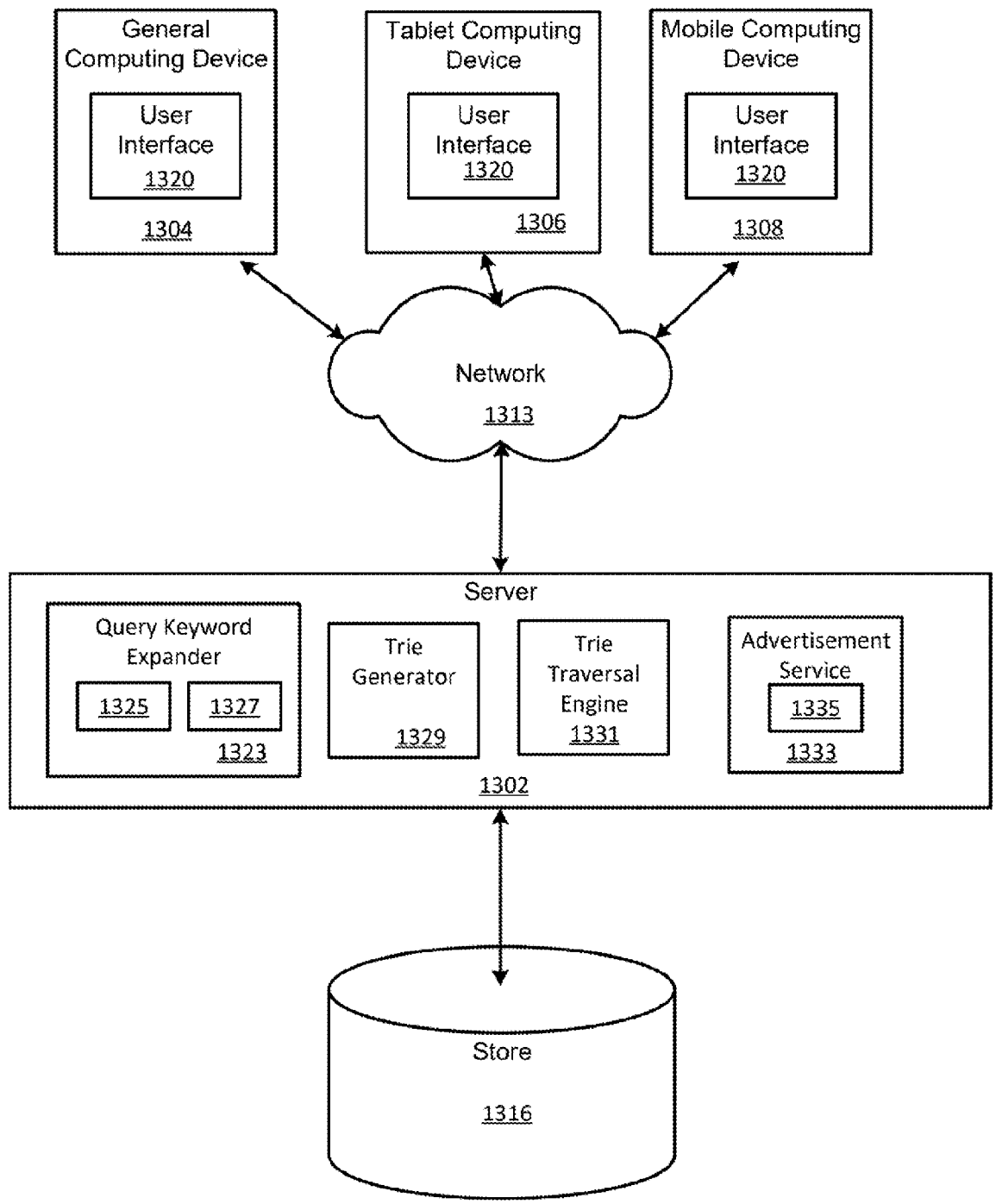
FIG. 13 illustrates one aspect of the architecture of a system for processing data.

FIGS. 11-13 and the associated descriptions provide a discussion of a variety of operating environments in which aspects of the disclosure may be practiced. However, the devices and systems illustrated and discussed with respect to FIGS. 11-13 are for purposes of example and illustration and are not limiting of a vast number of computing device configurations that may be utilized for practicing aspects of the disclosure, described herein.

FIG. 11 is a block diagram illustrating physical components (e.g., hardware) of a computing device 1100 with which aspects of the disclosure may be practiced. The computing device components described below may be suitable for the computing and/or processing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random-access memory (RAM)), non-volatile storage (e.g., read-only memory (ROM)), flash memory, or any combination of such memories.

The system memory 1104 may include an operating system 1105 and one or more program modules 1106 suitable for running software application 1120, such as one or more components supported by the systems described herein. As examples, system memory 1104 may include a query keyword expander 1123, encoder 1125, decoder 1127, a sponsored content service 1135, an query matching service 1133, a Trie generator 1129, and a Trie traversal engine 1131. The query keyword expander 1123 may be the same as or similar to the query keyword expander 118. The encoder 1125 may be the same as or similar to the previously described encoder 308. The decoder 1127 may be the same as or similar to the previously described decoder 312. The sponsored content service 1135 may be the same as or similar to the previously described sponsored content service 130. The query matching service 1133 may be the same as or similar to the previously described query matching service 132. The Trie generator 11129 may be the same as or similar to the previously described Trie generator 740. The Trie traversal engine may be the same as or similar to the previously described Trie traversal engine 1131. The operating system 1105, for example, may be suitable for controlling the operation of the computing device 1100.

Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable anchor non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 916 include, but are not limited to, radio frequency (RE) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 12A-12B illustrate a mobile computing device 1200, for example, a mobile telephone, a smart phone, wearable computer (such as a smart watch), a tablet computer, a laptop computer, and the like, with which embodiments of the disclosure may be practiced. In some respects, the client may be a mobile computing device. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display).

If included, an optional side input element 1215 allows further user input. The side input element 1215 may be a rotary switch, a button, or any other type of manual input element. In alternative aspects, mobile computing device 1200 may incorporate greater or fewer input elements. For example, the display 1205 may not be a touch screen in some embodiments.

In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display.

In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 1200 can incorporate a system (e.g., an architecture) 1202 to implement some aspects. In one embodiment, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200 described herein (e.g., search engine, extractor module, relevancy ranking module, answer scoring module, etc.).

The system 1202 has a power supply 1270, Which may be implemented as one or more batteries. The power supply 1270 might further include an external power source, such as an AC adapter or a powered docking cradle that supplements or recharges the batteries.

The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape, Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio interface layer 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

FIG. 13 illustrates one aspect of the architecture of a system for processing data received at a computing system from a remote source, such as a personal computer 1304, tablet computing device 1306, or mobile computing device 1308, as described above. Content at a server device 1310 may be stored in different communication channels or other storage types. For example, various documents may be stored using a directory service 1322, a web portal 1324, a mailbox service 1326, an instant messaging store 1328, or a social networking site 1330.

One or more of the previously described program modules 1106 or software applications 1107 may be employed by server device 1310 and/or the personal computer 1304, tablet computing device 1306, or mobile computing device 1308, as described above. For example, the server device 1310 may include a query keyword expander 1323, encoder 1325, decoder 1327, a sponsored content service 1335, an query matching service 1333, a Trie generator 1329, and a Trie traversal engine 1331. The query keyword expander 1323 may be the same as or similar to the query keyword expander 118. The encoder 1325 may be the same as or similar to the previously described encoder 308. The decoder 1327 may be the same as or similar to the previously described decoder 312. The sponsored content service 1335 may be the same as or similar to the previously described sponsored content service 130. The query matching service 1333 may be the same as or similar to the previously described query matching service 132. The Trie generator 1329 may be the same as or similar to the previously described Trie generator 740. The Trie traversal engine may be the same as or similar to the previously described Trie traversal engine 1331.

The server device 1310 may provide data to and from a client computing device such as a personal computer 1304, a tablet computing device 1306 and/or a mobile computing device 1308 (e.g., a smart phone) through a network 1315. By way of example, the computer system described above may be embodied in a personal computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

The present disclosure relates to systems and methods for generating a keyword sequence from an input query according to at least the examples provided in the sections below:

(A1) In one aspect, some embodiments include a method (e.g., 1000) of generating a keyword sequence from an input query (e.g., 108); receiving a first text sequence (e.g., 908) corresponding to an input query (e.g., 108) and encoding the first text sequence into a source sequence representation using an encoder (e.g., 308) of a machine learning model (e.g., 302); generating a keyword sequence (e.g., 128) from the source sequence representation using a decoder (e.g., 312) of the machine learning model (e.g., 302); generating a generation score (e.g., $g_1$) for a plurality of prediction tokens (e.g., 418, 420, 422), wherein the plurality of prediction tokens (e.g., 418, 420, 422) are based on the source sequence representation (e.g., 318) and a previously decoded partial hypothesis provided by the decoder (e.g., 312); generating a modified generation score (e.g., $g_{1_{modified}}$) for the plurality of prediction tokens (e.g., 418, 420, 422), wherein the modified generation score (e.g., $g_{1_{modified}}$) is based on the respective prediction token generation score(e.g., $g_1$) and a maximum generation score for a suffix (e.g., 432, 434; 436, 438, 440) of each prediction token (e.g., 420; 418; 422) of the plurality of prediction tokens (e.g., 418, 420, 422); selecting a prediction token (e.g., 420) of the plurality of prediction tokens (e.g., 418, 420, 422) based on the modified generation score (e.g., $g_{1_{modified}}$); adding text represented by the selected prediction token (e.g., 420) to the previously decoded partial hypothesis provided by the decoder (e.g., 312); and selecting content (e.g., 142) to be provided to a computing device (e.g., 104) in response to the input query (e.g., 108) based on the selected prediction token (e.g., 420), wherein the selected prediction token (e.g., 420) matches at least one keyword (e.g., 136) associated with the content (e.g., 142) to be provided to the computing device (e.g., 104).

(A2) In some embodiments of A1, the content (e.g., 142) to be provided to the computing device (e.g., 104) is an advertisement.

(A3) In some embodiments of A1-A2, the generation score (e.g., $g_1$) for the suffix (e.g., 432, 434; 436, 438, 440) of each prediction token (e.g., 420; 418; 422) of the plurality of prediction tokens (e.g., 418, 420, 422) is based on a generation score (e.g., $g_1$) for a token (e.g., 446) that is a suffix of the suffix (e.g., 432) of one or more prediction tokens (e.g., 420).

(A4) In some embodiments of A1-A3, the machine learning model (e.g., 302) is a sequence-to-sequence machine learning model trained on data corresponding to keyword sequence and output sequence pairs.

(A5) In some embodiments of A1-A4, the modified generation score (e.g., $g_{1_{modified}}$) for the plurality of prediction tokens (e.g., 418, 420, 422) is based on the respective prediction token generation score (e.g., $g_1$) and a maximum generation score (e.g., $\max(g_2[s_2])$) for a suffix (e.g., 432, 434; 436, 438, 440) of each prediction token (e.g., 420; 418; 422) of the plurality of prediction tokens (e.g., 420, 418, 422).

(A6) in some embodiments of A1-A5, the plurality of prediction tokens (e.g., 420, 418, 422) and the suffix (e.g., 432, 434; 436, 438, 440) of each prediction token (e.g., 420; 418; 422) are accessed from a Trie (e.g., FIG. 2E).

(A7) In some embodiments of A1-A6, the method further includes receiving a keyword (e.g., 812) to be added to the Trie (e.g., FIG. 2B); and adding (e.g., 816) the keyword to the Trie (e.g., FIG. 2B), wherein the keyword (e.g., 240) is added as a suffix to an existing token (e.g., 212) in the Trie (e.g., FIG. 2B).

(A8) In some embodiments of A1-A7, the plurality of prediction tokens (e.g., 420, 418, 422) and the suffix (e.g., 432, 434; 436, 438, 440) of each prediction token (e.g., 420; 418; 422) are constrained to the Trie (e.g., FIG. 2E).

(A9) In some embodiments of A1-A8, the method further includes selecting content (e.g., 142) to be provided to the computing device (e.g., 104) in response to the input query (e.g., 108) based on the previously decoded partial hypothesis and the selected prediction token (e.g., 420), wherein the previously decoded partial hypothesis and the selected prediction token (e.g., 420) matches at least one keyword (e.g., 236) associated with the content (e.g., 142) to be provided to the computing device (e.g., 104).

(A10) In some embodiments of A1-A9, the method further includes generating a plurality of hypotheses based on the selected prediction token (e.g., 420).

(A11) In some embodiments of A1-A10, the method further includes identifying a Trie (e.g. 808) associated with the first text sequence.

(A12) In some embodiments of A1-A11, the method further includes identifying suffixes (e.g., 432, 434) for the prediction tokens (e.g., 420, 418) from the Trie (e.g., FIG. 2E) associated with the first text sequence.

(A13) In some embodiments of A1-A12, the method further includes generating a modified generation score (e.g., $g_{1_{modified}}$) for a suffix (e.g., 432, 434; 436, 438, 440) of each prediction token. 420; 418; 422) of the plurality of prediction tokens (e.g., 420, 418, 422).

In yet another aspect, some embodiments include a computing system including one or more processors and memory coupled to the one or more processors, the memory storing one or more programs configured to be executed by the one or more processors, the one or more programs including instructions for performing any of the methods described herein (e.g., A1-A13 described above).

In yet another aspect, some embodiments include a non-transitory computer-readable storage medium storing one or more programs for execution by one or more processors of a storage device, the one or more programs including instructions for performing any of the methods described herein (e.g., A1-A13 described above).

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating a keyword sequence from an input query, the method comprising:
receiving a first text sequence corresponding to an input query;
encoding the first text sequence into a source sequence representation using an encoder of a machine learning model executed by a server computer system including an encoder and a decoder, the source sequence representation including a first set of tokens corresponding to the input query;

generating a keyword sequence from the source sequence representation using a decoder of the machine learning model, the keyword sequence including a second set of tokens relevant to the input query and not including the first set of tokens corresponding to the input query;

generating, by the decoder, a generation score for a first prediction token of a plurality of prediction tokens, wherein the plurality of prediction tokens are based on the source sequence representation and a previously decoded partial hypothesis provided by the decoder, where the previously decoded partial hypothesis includes a first subset of tokens of the second set of tokens stored in a trie;

generating, by the decoder, a modified generation score for the first prediction token, wherein the modified generation score for the first prediction token is based on the generation score and a maximum generation score for a suffix of the first prediction token, where the suffix includes a second subset of tokens of the second set of tokens stored within a path of the trie corresponding to the first prediction token;

selecting a second prediction token of the second subset of tokens based on the modified generation score;

adding the second prediction token to the previously decoded partial hypothesis generated by the decoder; and selecting content to be provided to a computing device in response to the input query based on the second subset of tokens of the second set of tokens, wherein at least one token of the second subset of tokens of the second set of tokens matches at least one keyword associated with the content to be provided to the computing device.

2. The method of claim 1, wherein the content to be provided to the computing device is an advertisement.

3. The method of claim 1, wherein the generation score based on a second generation score for a token that is a suffix of the suffix of one or more prediction tokens.

4. The method of claim 1, wherein the machine learning model is a sequence-to-sequence machine learning model trained on data corresponding to keyword sequence and output sequence pairs.

5. The method of claim 1, further comprising:
receiving a keyword to be added to the trie; and
adding the keyword to the trie, wherein the keyword is a suffix to an existing keyword in the trie.

6. The method of claim 1, wherein the plurality of prediction tokens and the suffix of each prediction token are constrained to the trie.

7. The method of claim 1, further comprising selecting content to be provided to the computing device in response to the input query based on the previously decoded partial hypothesis and the second prediction token, wherein the previously decoded partial hypothesis and the second prediction token matches at least one keyword segment associated with the content to be provided to the computing device.

8. The method of claim 1, further comprising generating a plurality of hypotheses based on the second prediction token.

9. The method of claim 1, further comprising identifying the trie associated with the first text sequence.

10. The method of claim 9, further comprising identifying suffixes for tokens stored in the trie associated with the first text sequence.

11. The method of claim 1, further comprising generating a set of modified generation scores for a set of suffixes of the plurality of prediction tokens.

12. A computer-readable storage medium including instructions, which when executed by a processor, cause the processor to perform the method of claim 1.

13. A system comprising a processor and memory including instructions which when executed by the processor cause the processor to perform the method of claim 1.

14. A method for generating a keyword sequence from an input query, the method comprising:
encoding a text sequence into a source sequence representation using an encoder of a machine learning model executed by a server computer system, the machine learning model including an encoder and a decoder, the source sequence representation including a first set of tokens corresponding to an input query;
generating a keyword sequence from the source sequence representation using the decoder of the machine learning model, the keyword sequence including a second set of tokens relevant to the input query and not including the first set of tokens corresponding to the input query;
generating, by the decoder, a generation score for a first prediction token of a plurality of prediction tokens, wherein the plurality of prediction tokens are based on the source sequence representation and a previously decoded partial hypothesis provided by the decoder, where the previously decoded partial hypothesis includes a first subset of tokens of the second set of tokens stored in a trie;
generating, by the decoder, a modified generation score for the first prediction token;
selecting a second prediction token of second set of tokens based on the modified generation score;
adding the second prediction token to the previously decoded partial hypothesis provided by the decoder; and
selecting content to be provided to a computing device based on the second prediction token, wherein the second prediction token matches at least one keyword associated with the content to be provided to the computing device.

15. The method of claim 14, wherein the modified generation score is based on the generation score and a maximum generation score for a suffix of the first prediction token.

16. The method of claim 15, wherein the plurality of prediction tokens and the suffix are accessed from a Trie, and wherein the method further comprises:
receiving a keyword to be added to the Trie; and
adding the keyword to the Trie, wherein the keyword is a suffix to an existing keyword in the Trie.

17. A method for generating a keyword sequence from an input query, the method comprising:
receiving a text sequence corresponding to an input query;
encoding the text sequence into a source sequence representation using an encoder of a machine learning model including an encoder and a decoder executed by a computer system, the source sequence representation including a first set of tokens corresponding to the input query;
generating, by the decoder, a generation score for a first prediction token of a plurality of prediction tokens, wherein the plurality of prediction tokens are based on the source sequence representation and a previously decoded partial hypothesis provided by the decoder of the machine learning model, where the previously decoded partial hypothesis includes a first subset of tokens of a second set of tokens stored in a trie;

generating, by the decoder, a modified generation score for the first prediction token of the plurality of prediction tokens, wherein the modified generation score for the first prediction token of the plurality of prediction tokens is based on the respective prediction token generation score for the first prediction token and a maximum generation score for a suffix of the first prediction token of the plurality of prediction tokens, where the suffix includes a second subset of tokens of the second set of tokens stored within a path of the trie corresponding to the first prediction token;

selecting a second prediction token of the second subset of tokens based on the modified generation score;

adding the second prediction token to the previously decoded partial hypothesis provided by the decoder; and selecting content to be provided to a computing device in response to the input query based on the second prediction token.

18. The method of claim 17, wherein the modified generation score based on the generation score and a maximum generation score for a suffix of the first prediction token.

19. The method of claim 17, wherein the suffix is obtained from a trie generated based on the input query.

20. The method of claim 17, further comprising:
receiving a keyword to be added to the trie; and
adding the keyword to the trie, wherein the keyword is a second suffix to a second keyword stored in the Trie.

* * * * *